US012675730B2

(12) United States Patent
Mohandoss et al.

(10) Patent No.: US 12,675,730 B2
(45) Date of Patent: Jul. 7, 2026

(54) COGNITIVE PLATFORM FOR AUTONOMOUS DATA ORCHESTRATION AND THE METHOD THEREOF

(71) Applicant: Infosys Limited, Bangalore (IN)

(72) Inventors: Ramaswami Mohandoss, Chennai (IN); Rajan Padmanabhan, Plano, TX (US)

(73) Assignee: Infosys Limited, Bangalore (IN)

( * ) Notice: Subject to any disclaimer, the term of this patent is extended or adjusted under 35 U.S.C. 154(b) by 1074 days.

(21) Appl. No.: 17/368,000

(22) Filed: Jul. 6, 2021

(65) Prior Publication Data

US 2022/0027788 A1      Jan. 27, 2022

(30) Foreign Application Priority Data

Jul. 21, 2020    (IN) .............................. 202041031153

(51) Int. Cl.
*G06N 20/00*         (2019.01)
*G06N 5/022*         (2023.01)

(52) U.S. Cl.
CPC .................................... *G06N 20/00* (2019.01)

(58) Field of Classification Search
CPC .......... G06N 20/00; G06N 5/022; G06N 5/00; G06N 5/02; G06N 20/10; G06N 20/20; G06N 20/025
See application file for complete search history.

(56) References Cited

U.S. PATENT DOCUMENTS

| | | | |
|---|---|---|---|
| 7,849,041 B2 | 12/2010 | Forbes et al. | |
| 9,798,977 B2 | 10/2017 | Saxena et al. | |
| 10,268,955 B2 | 4/2019 | Chawla et al. | |
| 2015/0095159 A1 | 4/2015 | Kennewick et al. | |
| 2017/0293851 A1 | 10/2017 | Chawla et al. | |
| 2017/0330094 A1* | 11/2017 | Lindsley | ............. G06F 16/9024 |
| 2018/0330251 A1 | 11/2018 | Sanchez et al. | |
| 2019/0332647 A1* | 10/2019 | Rincon Opden Bosch | ................. G06F 40/14 |

* cited by examiner

*Primary Examiner* — Kamran Afshar
*Assistant Examiner* — Steven Phung
(74) *Attorney, Agent, or Firm* — Finnegan, Henderson, Farabow, Garrett & Dunner, LLP

(57) ABSTRACT

A system and/or a method for a cognitive platform for autonomous data orchestration, comprising edge computing devices, data platforms and cognitive computing engine. The cognitive computing engine is configured to receive digital events either generated by external computing devices or within the cognitive computing engine. Context and state information is accessed from a central intelligence store to determine the intent of the received digital events. A target entity is identified based on at least one of the determined intent. A data package is composed for the identified at least one target entity, transformed to a natural language text and communicated to the identified at least one target entity, inciting the target entity to take action on the package delivered. The central intelligence store is updated new context and intents for subsequent digital events making it an autonomous learning platform.

14 Claims, 13 Drawing Sheets

RECEIVE DIGITAL EVENTS — 302

ACCESS DATA FROM CENTRAL INTELLIGENCE STORE — 304

DETERMINE INTENT OF THE DIGITAL EVENTS — 306

IDENTIFY TARGET ENTITY — 308

COMPOSE DATA PACKAGE TO BE COMMUNICATED TO THE TARGET ENTITY — 310

TRANSFORM DATA PACKAGE — 312

COMMUNICATE DATA PACKAGE TO TAGET ENTITY — 314

UPDATE CENTRAL INTELLIGENCE STORE — 316

COGNIZER RECIVES DIRECT SIGNAL FROM AN ENTITY                402

RESOLVER RESOLVES THE INTENT BASED ON SIGNAL, STATE AND CONTEXT                404

RESOLVER IDENTIFIES TARGET ENTITY                406

FETCHER DETERMINES RESPONSE                408

INCITER COMPOSES A DATA PACKAGE                410

CONTEXT UPDATER UPDATES CONTEXT AT INTELLIGENCE STORE                412

INCITER COMMUNICATES THE DATA PACKAGE TO TARGET ENTITY                414

INCEPTOR RECEIVES INTERNAL SIGNAL — 502

RESOLVER RESOLVES THE INTENT BASED ON SIGNAL, STATE AND CONTEXT — 504

RESOLVER IDENTIFIES TARGET ENTITY — 506

FETCHER DETERMINES RESPONSE — 508

INCITER COMPOSES DATA PACKAGE — 510

CONTEXT UPDATER UPDATES INSIGHTS AT THE INTELLIGENCE STORE — 512

INCITER COMMUNICATES THE DATA PACKAGE TO TARGET ENTITY — 514

C – CUSTOMER

E – EDUCATOR/
STYLIST

S – STYLE

L – LOCATION

C – CUSTOMER

E – EDUCATOR/
STYLIST

S – STYLE

L – LOCATION

C – CUSTOMER

E – EDUCATOR/
    STYLIST

S – STYLE

L – LOCATION

C – CUSTOMER

E – EDUCATOR/
    STYLIST

S – STYLE

L – LOCATION

P - PERSONA

COGNITIVE PLATFORM FOR AUTONOMOUS DATA ORCHESTRATION AND THE METHOD THEREOF

This application claims the benefit of Indian Patent Application Serial No. 20204/031153 filed Jul. 21, 2020, which is hereby incorporated by reference in its entirety.

FIELD

The field generally relates autonomous cognitive platforms. In particular, the present technique relates to autonomous learning and insights creation through cognitive capabilities across data platforms.

BACKGROUND

Cognitive platforms are the future technology. Cognitive computing describes technology platforms that are based on artificial intelligence and signal processing, which encompasses machine learning, reasoning, natural language processing, human computer interaction and other technologies. Be it chat bots, recommendation engines, loyalty systems or optimization systems, there are numerous products built on niche AI/ML technologies that tend to make the most out of data and offer a compelling consumer experience. Following are some of their characteristics and challenges.

The above-mentioned products are designed and built around a specific use case and tend to go deep to offer a great experience. As these products evolve, they tend to get isolated or cut off from other complementing products, which together pursue to make data work for its subjects. For instance, a recommendation platform would care little about how the supply chain works in an enterprise. Such an ecosystem limits the ability to detect signals or events that span across domains.

Also, because these products are centered around a use case, these will not address all the motivations of the targeted personas (when the subject is a human) holistically. For instance, a store manager might be required to invoke multiple apps, one to plan store assortment and an another to handle customers etc. Intelligence and context are not effectively leveraged across products/apps. In scenarios that necessitates an outcome be prescribed through more than one niche (AI/ML) products working together, lack of a common framework will limit our ability to express why a specific outcome was prescribed. In other words, implementing provenance in decision making would be a challenge.

Most of these products are designed to react to a consumer's action. They may recommend and prescribe in response to user events. They may notify and even alert the consumers when there is a required action to be performed. A signal through some user generated event is generally required for these products to act. Also, most of the products rely on data patterns and behave deterministically in connecting the signal to the action i.e. they seldom connect signals with actions that align with the primal motivations of the subject. For instance, in a retail scenario, a signal detected through an affinity between two styles (or products) is likely to result in the following experience for all subjects (customers and stylists)—'those who liked this also liked that'.

Hence there is need to overcome the above-mentioned problem to make the products more realistic and which could fit across domains.

SUMMARY

Presently, few products have filled around us and we see, we hear or use it every day. Bots are one among them. Most of them are sprinkled with Artificial Intelligence. The future is a platform that makes process cognitive. Most describe Artificial Intelligence (AI) and Cognitive platforms as same. But they are different. Artificial Intelligence, which is generally defined as combination of Machine Learning, Natural Language Processing and Algorithms may be domain specific. Cognitive platforms are one level up, or may be called as super set, which spans across domains and mimics the human brain. Today, significant portion of the information is unstructured, and few computers can work with that data in a valuable way. A computer in order to understand and learn from the data that it processes and to have decision making capability, one cannot apply simple algorithms, but it requires a software and hardware components that mimic the human brain. The cognitive platforms learn, communicates and does problem solving. If to say in few words, Cognitive platforms are the future.

Disclosed are a system and/or a method for a cognitive platform for autonomous data orchestration through autonomous learning, automated insight creation and contextual application of insights across entities and contexts.

In one aspect, a cognitive platform for autonomous data orchestration is disclosed. The cognitive platform comprises one or more components, but not limited to one or more edge computing devices, one or more data platforms and/or a cognitive computing engine. The cognitive computing engine further comprises various components as described in one or more embodiments of the present disclosure. The cognitive computing engine is configured to receive digital events. The digital events may be generated from one or more external computing devices. The digital events may also be generated at the cognitive computing engine. One or more data is accessed from a central intelligence store to determine the intent of the received digital events. The one or more data comprise at least one of, but not limited to, context information, state information and/or plurality of previous digital events stored in the central intelligence store. At least one target entity is identified based on at least one of the determined intent or the one or more data accessed from the central intelligence store. The at least one target entity may be either at least one of the one or more external computing devices from where the digital events are generated, or any another external computing device communicatively coupled to the cognitive computing engine over a computer network, or combination of both. A data package is composed for the identified at least one target entity based on the determined intent, the data received from the central intelligence store and/or relationship data from mindmap. The data package is transformed to a natural language text and is communicated to the identified at least one target entity, inciting the target entity to take action on the package delivered. The cognitive computing engine is configured to update the central intelligence store with received digital events and the determined intent for processing subsequent digital events.

In another aspect, a method for cognitive platform for autonomous data orchestration is disclosed. The method comprising one or more steps of receiving digital events at a cognitive computing engine. The digital events may be generated from one or more external computing devices. The digital events may also be generated at the cognitive computing engine. One or more data is accessed from a central intelligence store to determine the intent of the received digital events. The one or more data comprise at least one of, but not limited to, context information, state information and/or plurality of previous digital events stored in the central intelligence store. At least one target entity is identified based on at least one of the determined intent or the one or more data accessed from the central intelligence store. The at least one target entity may be either at least one of the one or more external computing from where the digital events are generated, or any other external computing devices communicatively coupled to the cognitive computing engine over a computer network, or combination of both. A data package is composed for the identified at least one target entity based on the determined intent, the data received from the central intelligence store and/or relationship data from mindmap. The data package is transformed to a natural language text and is communicated to the identified at least one target entity, inciting the target entity to take action on the package delivered. The cognitive computing engine is configured to update the central intelligence store with received digital events and the determined intent for processing subsequent digital events.

In yet another aspect, non-transitory computer readable medium for cognitive platform is disclosed, wherein, comprising machine executable code which when executed by at least one processor, causes the at least one processor to perform steps of receiving digital events at a cognitive computing engine. The digital events may be generated from one or more external computing devices. The digital events may also be generated at the cognitive computing engine. One or more data is accessed from a central intelligence store to determine the intent of the received digital events. The one or more data comprise at least one of, but not limited to, context information, state information and/or plurality of previous digital events stored in the central intelligence store. At least one target entity is identified based on at least one of the determined intent or the one or more data accessed from the central intelligence store. The at least one target entity may be either at least one of the one or more external computing devices from where the digital events are generated, or any other external computing devices communicatively coupled to the cognitive computing engine over a computer network, or combination of both. A data package is composed for the identified at least one target entity based on the determined intent, the data received from the central intelligence store and/or relationship data from mindmap. The data package is transformed to a natural language text and is communicated to the identified at least one target entity, inciting the target entity to take action on the package delivered. The cognitive computing engine is configured to update the central intelligence store with received digital events and the determined intent for processing subsequent digital events.

The method, the system, and/or the non-transitory computer readable storage medium disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

The objective of invention in the present disclosure is to overcome the technical problem mentioned in the background section by a cognitive platform for autonomous data orchestration through autonomous learning, automated insight creation and contextual application of insights across entities and contexts.

In one or more embodiments, a method, system and/or computer readable storage medium for cognitive platform for autonomous data orchestration is disclosed. The method comprising one or more steps of receiving digital events at a cognitive computing engine. The digital events may be generated from one or more external computing devices. The digital events may also be generated at the cognitive computing engine. One or more data is accessed from a central intelligence store to determine the intent of the received digital events. The one or more data comprise at least one of, but not limited to, context information, state information and/or plurality of previous digital events stored in the central intelligence store. At least one target entity is identified based on at least one of the determined intent or the one or more data accessed from the central intelligence store. The at least one target entity may be either at least one of the one or more external computing devices from where the digital events are generated, or any other external computing devices communicatively coupled to the cognitive computing engine over a computer network, or combination of both. A data package is composed for the identified at least one target entity based on the determined intent, the data received from the central intelligence store and/or relationship data from mindmap. The data package is transformed to a natural language text and is communicated to the identified at least one target entity, inciting the target entity to take action on the package delivered. The cognitive computing engine is configured to update the central intelligence store with received digital events and the determined intent for subsequent digital events.

Figure 1:
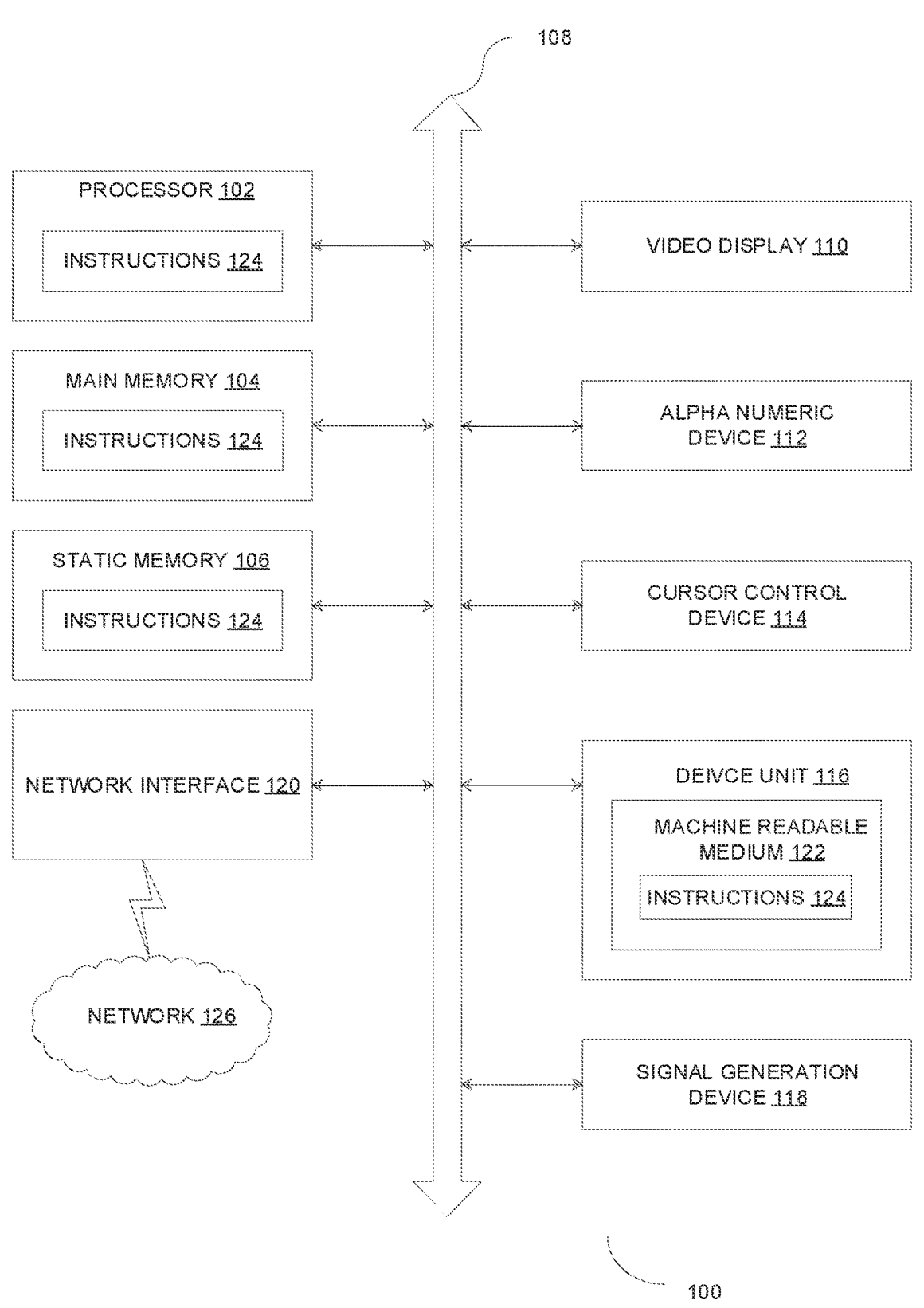
FIG. 1 is a diagrammatic representation of a data processing system capable of processing a set of instructions to perform any one or more of the methodologies herein, according to one or more embodiments.

FIG. 1 is a diagrammatic representation of a data processing device capable of processing a set of instructions to perform any one or more of the methodologies herein, according to one embodiment. FIG. 1 shows a diagrammatic representation of machine and/or the data processing device in the example form of a computer system 100 within which a set of instructions, for causing the machine to perform any one or more of the methodologies discussed herein, may be executed. In various embodiments, the machine operates as a standalone device and/or may be connected (e.g., networked) to other machines.

A machine may be a personal computer (PC), laptop or an embedded system and/or any machine capable of executing a set of instructions (sequential or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The example computer system 100 includes a processor 102 (e.g., a central processing unit (CPU) a graphics processing unit (GPU) and/or both), a main memory 104 and a static memory 106, which communicate with each other via a bus 108. The computer system 100 may further include a video display unit 110 (e.g., a liquid crystal displays (LCD) and/or a cathode ray tube (CRT)). The computer system 100 also includes an alphanumeric input device 112 (e.g., a keyboard), a cursor control device 114 (e.g., a mouse), a disk drive unit 116, a signal generation device 118 (e.g., a speaker), micro controller 128 (e.g., programmable logic controller) and a network interface 120.

The disk drive unit 116 includes a machine-readable medium 122 on which is stored one or more sets of instructions 124 (e.g., software) embodying any one or more of the methodologies and/or functions described herein. The instructions 124 may also reside, completely and/or at least partially, within the main memory 104, within the static memory 106 and/or within the processor 102 during execution thereof by the computer system 100, the main memory 104 and the processor 102 also constituting machine-readable media.

The instructions 124 may further be transmitted and/or received over a network 126 via the network interface 120. While the machine-readable medium 122 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical media and magnetic media.

Figure 2:
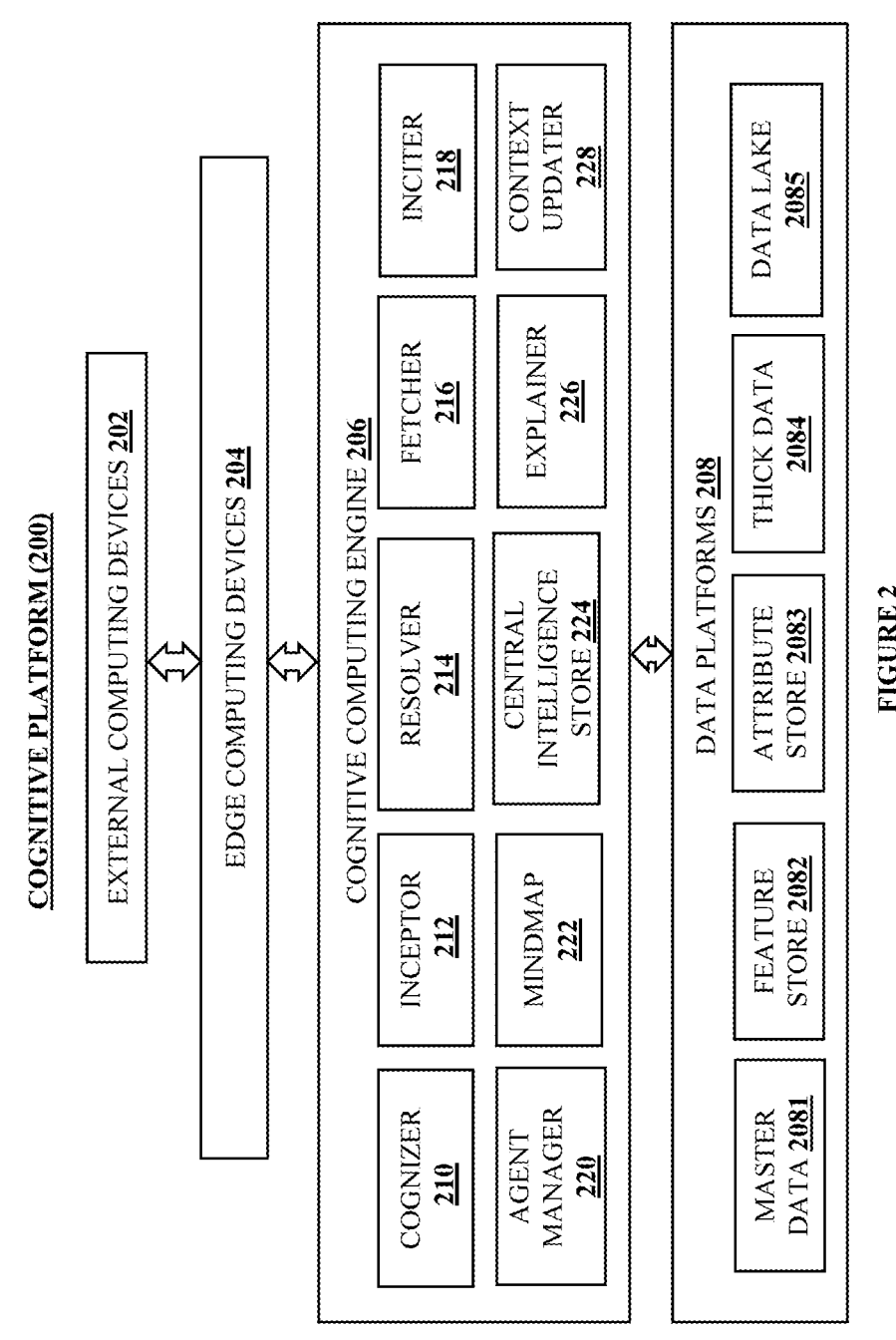
FIG. 2 is an architecture diagram illustrating a components cognitive platform for autonomous data orchestration, according to one or more embodiments.

FIG. 2 is an architecture diagram illustrating various components of cognitive platform 200, according to one or more embodiments. In one or more embodiments, the cognitive platform 200 may comprise one or more components, but not limited to an Edge computing devices 204, a cognitive computing engine 206 and data platforms 208. The cognitive computing engine 206 may be placed between the data platforms 208 and the Edge computing devices 204, wherein the cognitive computing engine 206, the data platforms 208 and the Edge computing devices 204 are connected to each other over a computer network. The Edge computing devices 204 may further be connected to external computing devices 202 such as, but not limited to handheld devices, telecommunication devices, computers and/or IoT devices. The data platforms 208 may comprise one or more data storage platforms such as, but not limited to a master data storage platform 2081 configured to store static reference data about an entity like a consumer name, a feature storage platform 2082 configured to store data like a consumer age which is likely to influence and predict outcomes of cognitive platform—for instance probability of consumer purchasing or returning a product, an attribute storage platform 2083 configured to store processed data like a consumer loyalty score, a thick data storage platform 2084 configured to store qualitative information like a survey information, and/or a data lake 2085 which is data storage platform that serves as an authorized system of reference of a variety of data which are stored in the master data storage platform 2081, the feature storage platform 2082, the attribute storage platform 2083 and the thick data storage platform 2084.

Referring back to the cognitive computing engine 206, the heart of the cognitive platform 200, may comprise one or more components, but not limited to a cognizer 210, an inceptor 212, a resolver 214, a fetcher 216, an inciter 218, agent manager 220, a mindmap 222, a central intelligence store 224, an explainer 226 and a context updater 228. The one or more components of the cognitive computing engine 206 of the cognitive platform 200 may be realized through either or combination of hardware and/or software components configured to execute one or more instruction through one or more processor embedded in the cognitive platform 200. Each of the components of the cognitive computing engine 206 may be communicatively coupled to the other components through at least one of, but not limited to application program interfaces (APIs), remote procedure calls (RPCs), sub routines or through dedicated hardware.

In one or more embodiments, the cognitive platform 200 may be configured to handle both the direct signals and indirect signals in an integrated manner. The direct signals and the indirect signals are the plurality of digital events generated by various components associated with the cognitive platform 200 or through one or more external computing devices 202 communicatively coupled to the cognitive platform 200. The direct signals may be plurality of external digital events generated by external computing devices 202 connected to the cognitive computing engine 206 through Edge computing devices 204 over a computer network. For example, browsing activity of a user though a user device may be an external digital events (also referred as direct digital events). For example, a user searching for a product on an e-commerce website or using an app through a handheld device may be an external digital event. The user may carry out multiple actions on the handheld device such as product search, product selection, failed search, traffic drop etc which may generate digital events or digital signals. All such events may be considered as a direct digital events or direct signals, which are captured in real time with respect to the user or a device, wherein the relevant information is extracted from the signals or digital events or any such activity which would send information in packets through communication network using protocols. Consider a case wherein the user is inactive for many days or there is a demand drop in the selling of a product on an e-commerce platform, these can be examples of indirect signal or indirect digital events. The cognitive computing engine 206 using machine learning capabilities may trigger an indirect signal so that one or more targeted communication or alert signals are sent to personal computing devices associated with one or more target entities.

In one or more embodiments, the cognizer 210 may be configured to receive one or more direct signals (also termed as 'direct digital events') at a cognitive platform 200. The direct digitals also termed as external signals or external digital events may be those events originated from external computing devices 202 (also termed as end user computing devices 202 or client devices 202) connected to cognitive computing engine 206 through Edge computing devices 204. The cognizer 210 may be configured to receive digital events from end user computing device 202 through Edge computing devices 204 and forward the received digital events to the resolver 214. The cognizer 210 may be communicatively coupled to the resolver 214 through at least one of, but not limited to application program interfaces (APIs), remote procedure calls (RPCs), sub routines or through dedicated hardware.

In one or more embodiments, the inceptor 212 may be configured to receive one or more indirect signals (also termed as 'indirect digital events') in a cognitive platform 200. The data stored in the central intelligence store 224 may not be kept idle till there are requests or signals from external computing devices 202. The cognitive computing engine 206 may be configured to determine one or more data points, based on which the digital events may be triggered to the inceptor 212. The data points may be determined dynamically based on plurality of machine learning algorithms capable of determining the triggering points based on previous activities/requests of one or more entities. In various embodiments, the triggering points may be determined based on inactivity of the one or more entities as well. For example: a retail consumer who did not login or browse through the retailer's mobile application or the website for a certain period of time as per-defined by a service provider or by analyzing browsing history of the retail customer or by analyzing general browsing trend of customers based on parameters such as, but not limited to geographical location of the customers, or regional specific events. Further, the inceptor 212 may be communicatively coupled with various components of the cognitive computing engine 206, but not limited to, central intelligence store 224, mindmap 222 and/or resolver 214. The inceptor 212 may be configured to receive one or more data points or triggering points from the central intelligence store 224, based on the industry specific ontology stored in the mindmap 222 which may act as a reasoning platform where connections constantly evolve with every digital events.

In one or more embodiments, the resolver 214 may be configured to receive inputs from either the cognizer 210 or the inceptor 212 based on the type of signal. In case of direct signals, the resolver 214 may be configured to receive inputs from the cognizer 210. In case of indirect signals, the resolver 214 may be configured to receive inputs from inceptor 212. Both the direct signals and indirect signals are processed by the resolver 214 in order to identify intent behind the received signal and to identify a target entity, based on the received signal, as a function of signal and one or more data accessed from the central intelligence store 224, such as, but not limited to previously stored signals/ digital events, context information and/or state information i.e. f(singnal,state,context). Further the resolver 214 may be configured to send the determined intent information and identified target entity information to fetcher 216 for the next steps.

In one or more embodiments, the fetcher 216 may be configured to receive inputs from the resolver 214 and dynamically generate one or more queries, to obtain responses from central intelligence store and send the obtained response to the inciter 218. The fetcher 216 may be configured to dynamically convert the input received from the resolver 214, i.e. the signal/digital events, the intent of the signal/digital events and/or the identified target entity to an executable database query. In various embodiments, the fetcher 216 may receive the data from the resolver 214, which was accessed from the central intelligence store 224. In another embodiment, the fetcher 216 may be configured to access required information from the central intelligence store 224 to generate one or more queries. The fetcher 216 may also be configured to pass instructions to external APIs to perform at least one of, dynamically converting the input received from the resolver 214 into an executable database query and/or querying a database connected to the cognitive platform over a computer network. The fetcher 216, based on the executed query, may be configured to receive response from the central intelligence store 224 and/or the mindmap 222 which is to be communicated to the identified target entity. But, the response received from the central intelligence store 224 and/or mindmap 222 may not be in human readable structure or format. There comes the role of inciter 218, to compose the response into a data package that suits the identified target entity.

In one or more embodiments, the inciter 218 may be configured to receive inputs from the fetcher 216 comprising the response obtained from the central intelligence store 224. The inciter 218 may be configured to compose a data package dedicated to the target entity identified by the resolver 214. The inciter 218 may be configured to convert the inputs received from the fetcher 216 and covert it to a human interpretable text and then compose the data package. The inciter 218 may communicate the composed data package to the target entity communicatively coupled through edge computing devices 204. In one or more embodiments, the data package, along with the human interpretable text may include a deep link (in the form of a URL) to point to the proposed action intended for the target entity. The target entity may be associated with any computing devices that is capable of receiving the response from the inciter 218 as the response would be in human readable text. The context updater 228 may be configured to update the central intelligence store 224 by storing at least one of the digital events, the determined intent and/or the response received from the fetcher 216. Such update may be persisted in the central intelligence store 224 and may be used at the subsequent digital events received/generated at the cognitive platform 200.

In one or more embodiments, mindmap 222 may be configured to store industry specific ontologies such as, but not limited to Retail, Finance, Insurance etc, in the form of graphs that act as reasoning platform for the cognitive computing engine 206. The connections in the graph which represents the relationship between entities constantly evolve with every signal received/generated at the cognitive platform 200.

In one or more embodiments, the central intelligence store 224 may be configured to store context information and state information for plurality of entities. The central intelligence store 224 may also be configured to store all the signal information and the determined intent information, both the currently determined intent and previously resolved intents along with the signal information, which may be used in subsequent signals. The cognitive computing engine 206 is configured to learn from the previous signals and resolution and may act accordingly in the subsequent signals by continuously evolving with problem resolution and decision making capabilities through Artificial Intelligence (AI) and Machine Learning (ML) algorithms. The context information may comprise necessary insights needed for tactical use and may be derived in real-time, for instance a consumer's favorite brand may be picked up from the mind map and persisted as the context the moment the consumer logs in. The state information may comprise necessary insights that capture long term interest of entities related to signal. The context and state information may be updated in real-time whenever there is a new signal. With the enriched context information and state information, the cognizer 210 may predict next possible intent and may proactively incite actions for the target entity through the inciter 218.

In one or more embodiments, the explainer 226 may be designed to visually depict the function of the resolver 214 i.e. how the resolver 214 identifies the target entities and the intent to be fulfilled based on the state information and context information. The explainer 226 may be configured to trace back the processing steps performed by the resolver 214 and determine the influencing parameters (reasons) that caused the resolver 214 to identify the target entities and fulfilled intents of one or more signals. The explainer 226 may be configured to determine influencing parameters by receiving information from the central intelligence store 224 such as, but not limited to, context information, state information, possible target entities for a signal, their relevant intents and/or probability score associated with the target entities received. The explainer 226 may be configured to visually represent the above mentioned information using visual components such as, but not limited to bar chart, pie chart, Sankey diagram and/or sunburst chart which may be displayed on a display interface associated with any computing device as a response to request received by one or more source entities, target entities and/or any other entity with admin privileges of the cognitive platform 200.

Figure 3:
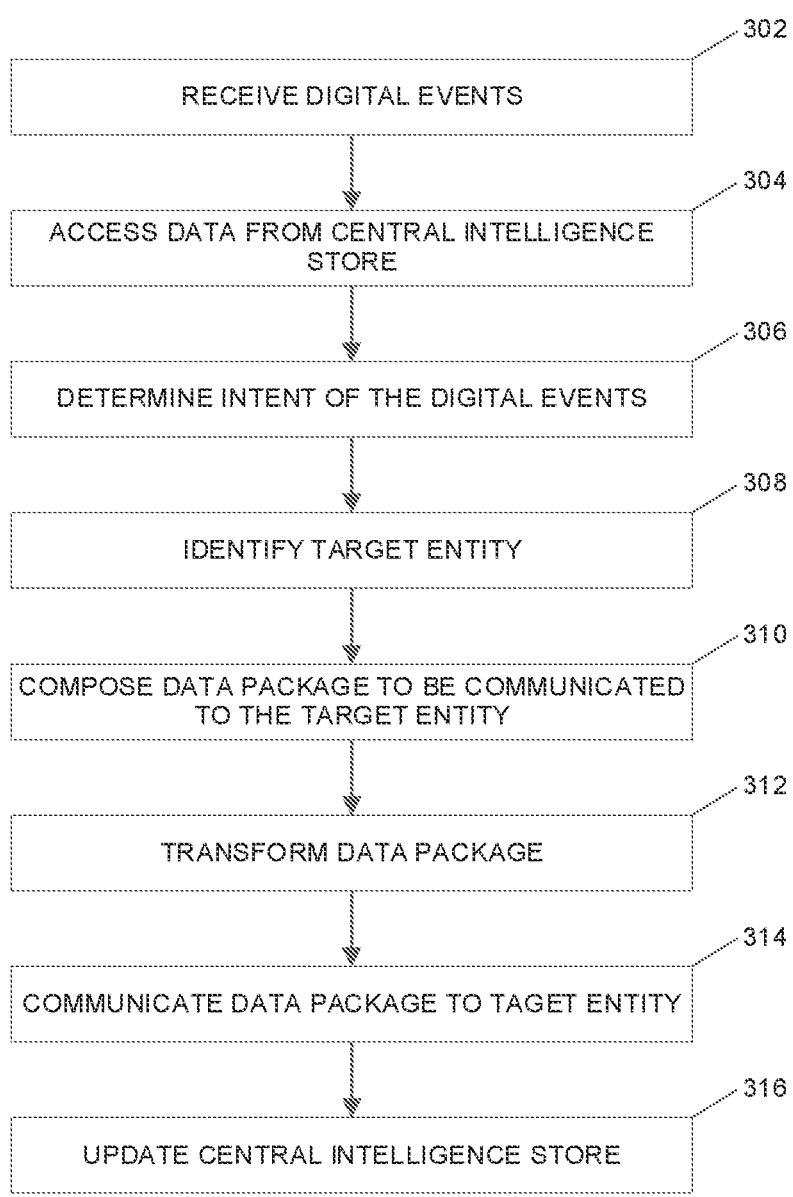
FIG. 3 is a process flow diagram illustrating steps performed by cognitive platform for autonomous data orchestration, according to one or more embodiments.

FIG. 3 is a process flow diagram illustrating steps performed by cognitive platform for autonomous data orchestration, according to one or more embodiments. The cognitive computing platform may comprise one or more components, but not limited to plurality of edge computing devices, plurality of data platforms and/or a cognitive computing engine. The edge computing devices, plurality of data platforms and/or the cognitive computing engine may be communicatively coupled to each other over a computer network. The cognitive computing engine may be configured to receive at least one digital event, as in step 302. The at least one digital event may be either a direct digital event (also referred as 'direct signal') or an indirect digital event (also referred as 'indirect signal'). In case of direct signal, the signal may be generated by one or more external computing devices communicatively coupled to the cognitive computing engine through Edge computing devices. In case of indirect signal, the signal may be generated within the cognitive computing engine.

In one or more embodiments, the cognitive computing engine is configured to periodically analyze the data stored in a central intelligence store. Based on the analysis or based on the pre-defined conditions set at the central intelligence store or based on the machine learning capabilities to analyze the data stored in the central intelligence store, the cognitive computing engine may detect an indirect signal to incite one or more target entities.

Based on the received signal, the cognitive computing engine may be configured to access one or more data from the central intelligence store based on payload information extracted from the received digital event/signal, as in step 304. In one or more embodiments, the central intelligence store may be configured to store one or more data, such as, but not limited to previous digital events, intents, context information and/or state information associated with entities. The previous digital events may be those direct signals or indirect signals received by the cognitive computing engine and stored in the central intelligence store. The intents may be those which are resolved by the cognitive computing engine for previously received and processed signals. These may be stored in the central intelligence store for the cognitive computing engine to learn from previous resolutions and to apply them in the subsequent signals. The cognitive computing engine may be configured to continuously learn from every resolution of intents. The cognitive computing engine may extract the details of source entity from the received signal and may access one or more data associated with the source entity. The accessed data may comprise, previous signals generated by the source entity, intents of the previous signal of the agent, context information and state information of the source entity and the possible target entities that are stored in the central intelligence store.

In one or more embodiments, the context information and state information may be an information associated with the entities interacted with the cognitive computing engine. The context information may comprise necessary insights needed for tactical use and may be derived in real-time. The contextual information may be short term information that can change frequently like a favorite brand of a customer. The state information may include insights that would not change as frequently as the context, for instance, attributes like age, gender and location of the consumer entity may not change as frequently as his/her favorite brand. The context information and state information may be updated in real-time whenever there is a new signal. In case of new entity, the context information and the state information may be created and stored in the central intelligence store for future use.

In one or more embodiments, the cognitive computing engine may be configured to determine the intent of the received digital event based on the one or more data accessed from the central intelligence store, as in step 306. The cognitive computing engine may determine the intent of the received digital event or the signal as a function of signal, state and context. The step of determining intent is described with an example embodiment in subsequent paragraphs of the present disclosure.

The cognitive computing engine may be configured to identify at least one target entity based on the determined intent and one or more data accessed from the central intelligence store, as in step 308. In case of direct signal, the target entity may be at least one of the entities from where the signal is generated or any other entity which is connected to the cognitive computing engine over a computer network. In case of indirect signal, the target entity may be any entity which is identified by the cognitive computing engine based on the intent and the one or more data accessed from the central intelligence store. In various embodiments of the present disclosure, target entities or the source entities may be a user, organization or any other entity which could use the results of cognitive operations. Based on the intent, the identified target entity, and one or more data extracted from the central intelligence store, the cognitive computing engine may be configured to compose data package to be communicated to the identified target entity, as in step 310

In one or more embodiments, the cognitive computing engine may create a database query, dynamically, to fetch the response to be delivered to the identified target entity. The response may be fetched from the central intelligence store and/or the mindmap, and the fetched response may be composed into a data package. Composing a data package from the response obtained from the central intelligence store and/or the mindmap is important here as the obtained response may not be in human readable format. The cognitive computing engine may transform the response obtained from the central intelligence store and/or the mindmap as a data package into a human readable format, as in step 312. The transformed data package may be communicated by the cognitive computing engine to the target entity over a computer network, as in step 314, which incites the target entity to act upon the transformed data package delivered to the target entity. As the target entity is incited to act on the communicated data package, the target entity may respond and hence generating another signal. In this case, it may be an external signal and which may be processed by the cognitive computing engine as described in various embodiments of the present disclosure.

In one or more embodiments, the data package may be transformed into human readable format, using one or more templates that suit the signal which is determined by the cognitive computing engine. One or more templates are stored in central intelligence store for each type of signal and response. At least one of the one or more templates are selected and the placeholders in the template may be populated with response obtained from the central intelligence store. For example, consider a manager is searching for skills in demand for his team members to be reskilled, may be using a chatbot. After the processing of signal by the cognizer, the resolver, the fetcher as configured, the inciter composes a data package as below:

{'Result': [{'e.empID': '130984', 'sk.skillID': '15675', 'lp.lpName': 'AWS Development'},
{'e.empID': '151616', 'sk.skillID': '15675', 'lp.lp-Name': 'AWS Development'},
{'e.empID': '618927', 'sk.skillID': '15675', 'lp.lp-Name': 'AWS Development'},
{'e.empID': '619797', 'sk.skillID': '15675', 'lp.lp-Name': 'AWS Development'},
{'e.empID': '667496', 'sk.skillID': '15675', 'lp.lp-Name': 'AWS Development'}],
'SessionId': '5df35691208dfd26288b1f15',
'PostResult': None,
'MasterEntity': {'EntityType': 'Employee', 'EntityId': '71879'},
'intent': 'LearningPathForSkillsByDU',
'signalId': '5e019a570a5e6bc930500778',
'Signal': [{'skillid': 15326, 'skillname': 'OBIEE', 'demandvalue': 18},
{'skillid': 13751, 'skillname': 'CRM-360', 'demandvalue': 5},
{'skillid': 15886, 'skillname': 'Cloudera Oryx', 'demandvalue': 3},
{'skillid': 15849, 'skillname': 'Managed File Transfer-All', 'demandvalue': 3},
{'skillid': 15290, 'skillname': 'Consulting—Data Management', 'demandvalue': 2}, {'skillid': 15675, 'skillname': 'Robotic Process Automation', 'demandvalue': 2},
{'skillid': 15890, 'skillname': 'NULL', 'demandvalue': 1},
{'skillid': 15850, 'skillname': 'IBM TRIRIGA', 'demandvalue': 1},
{'skillid': 13615, 'skillname': 'Book, Editorial, Featured Ads Management',
'demandvalue': 1}], 'SignalType': 'IdentifiedSkillsInDemandByDU', 'PreResult': None}

The response mentioned in the above format may not be easily understandable. Hence the inciter transforms the data package into human readable format by populating a template and the transformed data package may look like: "9 EMERGING DIGITAL SKILLS IN DEMAND. 5 MEMBERS FROM YOUR TEAM ARE ELIGIBLE TO BE RESKILLED". The inciter may be configured to send this transformed data package to the computing device associated with the manager, which may be sent as a response through chatbot. This human readable text can also be pushed to the target entity either in the form of a (but not limited to) text message, email or a notification on their mobile application. In one or more embodiments, the data package, along with the human interpretable text may include a deep link (in the form of a URL) to point to the proposed action intended for the target entity.

In one or more embodiments, the cognitive computing engine may be configured to update the received digital event and the determined intent in the central intelligence store to act upon the subsequent signals, as in step 316. The context information and the state information of both the source entities and the target entities may be updated in the central intelligence store.

Figure 4:
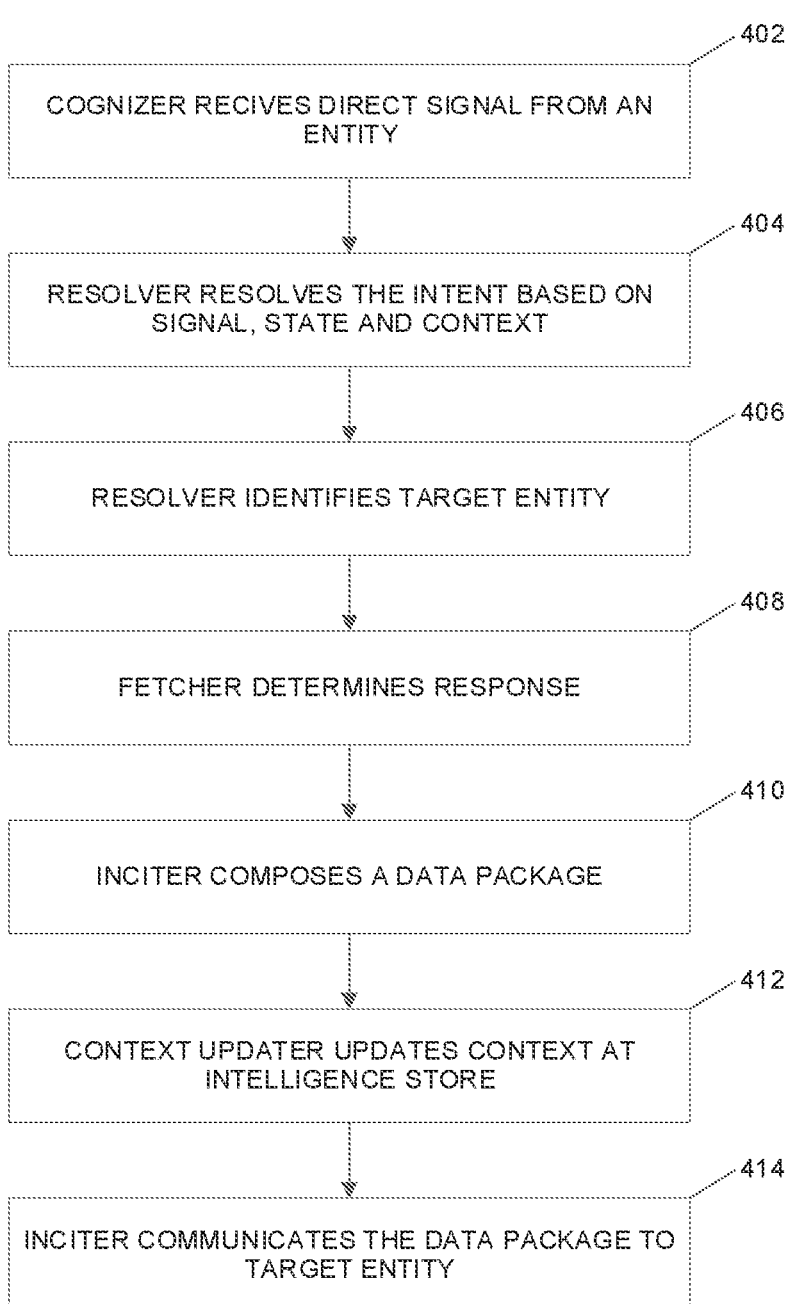
FIG. 4 is a process flow diagram illustrating steps executed by cognitive platform for autonomous data orchestration when the generated digital events is a direct digital event (direct signal), according to one or more embodiments.

FIG. 4 is a process flow diagram illustrating steps executed by cognitive platform for autonomous data orchestration when the generated digital events is a direct digital event (direct signal), according to one or more embodiments. In one or more embodiments, cognizer may be configured to receive one or more direct signals from plurality of external computing devices associated with one or more entities connected to the cognitive platform over a computer network, as in step 402. Whenever there is an activity by the user at the computing devices associated with the user, cognizer may be configured to perceive the signals generated by the computing device of the user. The signals may be across multiple computing devices associated with the user. For example, if user is logged-in on a mobile device and searches for a product on an e-commerce platform, a signal may be generated by the device and captured at the cognizer for that user. Similarly, if the user is logged-in at a web browser on a computer and searches for a product, a signal may be generated by the device on which the browser was accessed by the user and the signal may be captured at the cognizer for the same user. In both the cases, the signal may be generated by the same entity i.e., user. The cognizer may forward the received signal to the resolver. The resolver may resolve the intent behind the signal as a function of the signal, state and context, as in step 404. The resolver may receive the state information and context information of the entity from the central intelligence store. Based on the received signal, state and context information along with the resolved intent, the resolver may identify a target entity, as in step 406. It is to be noted that the target entity may be the entity from where the signal is received or it may be a different entity. Based on the identified target entity and the intent of the signal, the fetcher may determine a response to be communicated to the target entity, as in step 408. In other embodiments, the fetcher may use the context information and state information received from the resolver along with signal and resolved intent. The response may be determined by converting inputs received from the resolver and generating a database query to obtain response from the central intelligence store. The inciter may be configured to receive the response from the fetcher and compose a data package to be communicated to the identified target entity, as in step 410. The context updater may update the context and state information of both the source entity and the target entity in the central intelligence store, as in step 412. The context updater may also store the signal and resolved intent in the central intelligence store to act upon subsequent similar signals from other entities, any other signals from same entity or the combination thereof. The inciter may communicate the data package to the target entity as in step 414, thus inciting the target entity to act upon the data package delivered. The target entity may act upon the data package delivered, which causes the cognizer to receive another direct signal. Now, the target entity becomes the source entity where the signal in generated. The cognitive platform now, may perform one or more of steps disclosed in the present embodiment.

Figure 5:
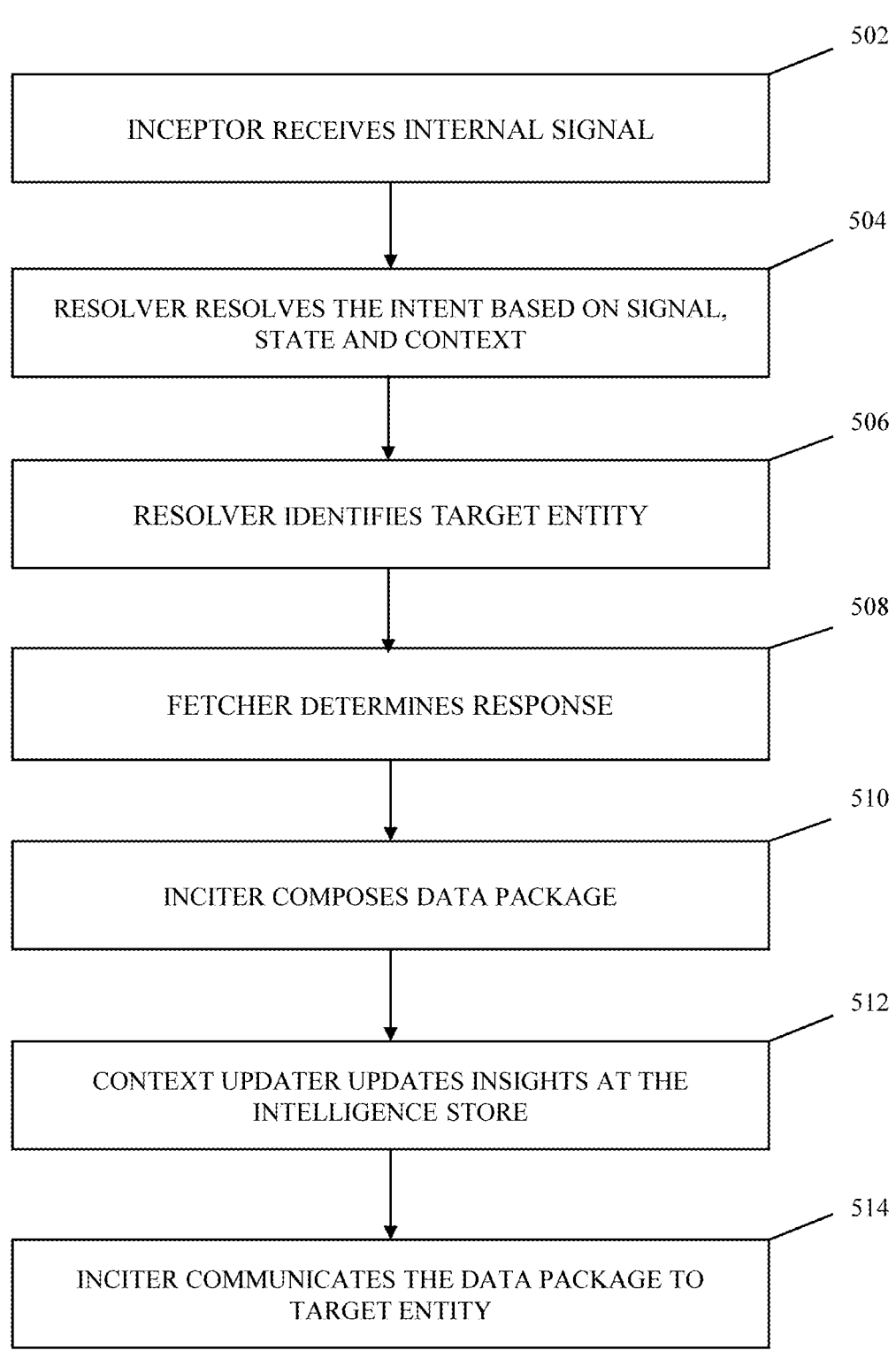
FIG. 5 is a process flow diagram illustrating steps executed by cognitive platform for autonomous data orchestration when the generated digital event in an indirect digital event (indirect signal), according to one or more embodiments.

FIG. 5 is a process flow diagram illustrating steps executed by cognitive platform for autonomous data orchestration when the generated digital event is an indirect digital event (indirect signal), according to one or more embodiments. In one or more embodiments, inciter may be configured to receive one or more indirect signals, as in step 502. The one or more indirect signals are generated based at least on the previous activity or inactivity of the entities communicatively coupled to the cognitive platform. The data stored in central intelligence store will never stay idle and is set to motion by deriving cognitive insights and inciting one or more entities to act on the signal. The inciter may forward the received signal to the resolver. The resolver may resolve the intent behind the signal as a function of the signal, state and context, as in step 504. The resolver may receive the state information and context information of the entity from the central intelligence store. Based on the received signal, state and context information along with the resolved intent, the resolver may identify a target entity, as in step 506. Based on the identified target entity and the intent of the signal, the fetcher may determine a response to be communicated to the target entity, as in step 508. In other embodiments, the fetcher may use the context and state information received from the resolver along with signal and intent. The response may be determined by converting inputs received from the resolver and generating a database query to obtain response from the central intelligence store. The inciter may be configured to receive the response from the fetcher and compose a data package to be communicated to the identified target entity, as in step 510.

The context updater may update the context information and state information of both the entity and the target entity in the central intelligence store, as in step 512. The context updater may also store the signal and resolved intent in the central intelligence store to act upon subsequent similar signals from other entities, any other signals from same entity or the combination thereof. The inciter may communicate the data package to the target entity as in step 514, thus inciting the target entity to act upon the data package delivered. The target entity may act upon the data package delivered, which causes the cognizer to receive another direct signal. Now, the target entity becomes the source entity where the signal in generated and the cognizer may receive signal from the entity and continue the process as described in case of direct signal.

In one or more embodiments, a resolver may be configured to determine the intent of the signal as a function of signal, state information and context information. The resolver may also be configured to identify the target entity. The resolver may be implemented though a Machine Learning (ML) model which constantly evolves based on every signal that is processed. For example, consider the below tables, assuming that context information and state information is persisted in central intelligence store.

In one or more embodiments, Table 1 illustrates the list of source entities and possible signals that can be generated at the personal computing devices associated with the source entities. The table also contains the state information and context information that may be available at the central intelligence store. In case of existing entities, some of the state information and context information maybe received from the central intelligence store. In case of new entities, the state information and the context information may be obtained from the payload present in the signal generated from the entities. In such cases, the cognitive platform may be configured to build the context based on activity of the new entities in subsequent signals.

TABLE 1

| Types of Signals Signals | | | | |
|---|---|---|---|---|
| Source Entity | Signals | Required State & Context | | |
| Customer | DormantCustomer | GuestId | — | — |
| | FailedSearch | GuestId | SearchText | — |
| | UnhappyGuest | GuestId | LocationId | StoreId |
| | UpcomingLifeEvent | GuestId | — | — |
| | ActiveGuest | GuestId | LocationId | StoreId |
| | TentativeGuest | GuestId | — | — |
| | SeekProposal | GuestId | — | — |
| | UpcomingAppointment | GuestId | StylistId | — |
| Location | TrafficDrop | StoreId | — | — |
| | TrafficSpike | StoreId | — | — |
| | SizeNotFound | Category | ProductId | LocationId |
| | ReturnSpike | Category | ProductId | LocationId |
| | SalesDrop | LocationId | — | — |
| | DemandDrop | Category | ProductId | LocationId |
| | DemandSpike | Category | ProductId | LocationId |
| Template | NewTemplate | TemplateId | — | — |
| Stylist | CreatedPersona | StylistId | PersonaId | — |
| | CreateProposal | StylistId | PersonaId | GuestId |

In one or more embodiments, Table 2 illustrates the list of possible context information and state information that may be stored in the central intelligence store. The contextual information may be short term information that can change frequently like favorite brand of a customer. The state information may include attributes that would not change as frequently as the context information.

TABLE 2

| State information and Context information stored at the central intelligence store Central Intelligence Store (State and Context) | | | |
|---|---|---|---|
| State | | Context | |
| Customer | Age | Product | TemplateId |
| | Gender | | Brand |
| | Store | | Category |
| | Brand | | . . . |
| | Category | Template | TemplateName |
| | Product | — | — |

TABLE 2-continued

| State information and Context information stored at the central intelligence store Central Intelligence Store (State and Context) | | |
|---|---|---|
| | State | Context |
| | State | — | — |
| | Last | — | — |
| | Active | | |
| | . . . | — | — |
| Store | GuestId | — | — |
| | . . . | — | — |
| Stylist | GuestId | — | — |
| | . . . | — | — |

In one or more embodiments, the Table 3 illustrates the list of possible intents that are evolved using Machine Learning (ML) models based on the signals processed. The list of possible intents may be stored in the central intelligence store along with the possible target entities in the form of graphs as a part of mindmap, comprising nodes and edges.

TABLE 3

| Intents and Target entity Intents | | | | |
|---|---|---|---|---|
| Target Entity | Intents | Required State & Context | | |
| Customer | AddToWardrobe | GuestId | ProductID | |
| | RecieveProposals | GuestId | PersonaId | StylistId |
| Store Manager | GreetGuest | GuestId | StoreId | |
| | RunPromo | GuestId | | |
| | GiftCustomer | GuestId | | |
| | ReviewAssortment | Category | ProductId | StoreId |
| | TagProduct | SearchText | | |
| | RunEmailCampaign | GuestId | | |
| Associate | PrepareVisit | GuestId | | |
| | TagProduct | SearchText | | |
| Product Designer | AnalyzeProduct | Category | ProductId | StoreId |
| Stylist | KnowGuest | GuestId | | |
| | BuildPersona | TemplateId | | |
| | BuildProposal | GuestId | | |
| | GreetGuest | GuestId | | |
| | TagProduct | SearchText | | |
| ProductionMgr | AnalyzeProduct | Category | ProductId | StoreId |

In one or more embodiments, Table 4 illustrates signal-intent compatibility which indicates who could the target entity based on the signal type and the source entity, wherein the compatibility data is evolves through machine learning capabilities applied on many such signals.

TABLE 4

| Signal-Intent Compatibility | | | |
|---|---|---|---|
| Signal | | Intent | |
| Source Entity | Signal Type | Intent Type | Target Entity |
| Customer | DormantCustomer | AddToWardrobe | Customer |
| | | BuildProposal | Stylist |
| | | GreetGuest | Stylist |
| | | RunPromo | Store Manager |
| | | GiftCustomer | Store Manager |

For example, consider a case wherein an entity who is a customer moves to a location wherein the personal computing device may send one or more signals comprising context and state information along with location information of the customer. The signal type may be 'Active Guest', the state information may be present in the signal i.e. GuestID. The context information may also be present in this case, which is Location ID and Store ID wherein the StoreID may be obtained through the capabilities available at the personal computing device of the customer. The cognizer may be configured to receive the signal, since the signal is a direct signal. The cognizer may communicate the signal to the resolver which is configured to identify the intent behind the signal and the target entity for the received signal. The GuestID extracted from the may be used by the resolver to extract any additional context information and state information stored in the central intelligence store for the particular customer. As described in earlier paragraphs, the resolver may be configured to determine the intent and target entity as a function of signal, state information and context information. Based on f('Active Guest', 'GuestID', 'Locaton ID', 'StoreID') the resolver may identify, based on the data in Table 3 stored in the central intelligence store that the target entity is store manager and the intent is 'Greet Guest'. After determining the intent and the target entity, the resolver may send the intent and target entity information to the fetcher. The fetcher maybe configured to compose a data query based on the intent and target entity information and receive response from the central intelligence store and/or mindmap. The response may be, but not limited to, profile details of the customer, purchase history of the customer and/or preferences of the customer. The inciter may be configured to receive the response from the fetcher and compose a data package. The inciter may transform the data package and send it to the computing device associated with the store manager who is the target entity. The store manager may receive the communication and in turn may greet the customer with some offers which the fetcher had identified as a part of response obtained from the central intelligence store and/or the mindmap. When the store manager acts on the communication received, it in turn may create a direct signal, which may be processed by the cognitive computing engine as disclosed by various embodiments of the present disclosure.

As illustrated in Table 4, there could be multiple target entities for a particular signal type for an entity. In case of a signal type 'Dormant Customer' which is an indirect signal, there may be multiple target entities who have to be targeted by the cognitive platform and the cognitive platform may be configured to perform such operations as disclosed in various embodiments.

In one or more embodiments, a design specification for realizing a continuously learning cognitive platform that is configured to autonomously derive insights from data and apply insights on one or more entities is disclosed. The one or more entities may be, but not limited to human persona, digital system, computing machines and/or an organization. At the heart of the design in the cognizer (also referred as 'cognize master') that may respond to any signal with the help of intelligence persisted through an intelligence store and data collections through mindmap. A signal (also referred as 'digital events') may be received in two ways. The signal may be detected from an event through one or more sensors. The signal may also be detected internally through inceptor component. The inceptor component may be configured to receive/perceive one or more signals even when there is no explicit user activity, through an AI based trained agents.

A central intelligence store may be configured to capture and persist intelligence in one or more forms, but not limited to context information and/or state information. Context information may comprise necessary insights needed for tactical use and may be derived in real time. State information may comprise information that capture long terms interests of one or more subjects related to the signal. For every signal detected, cognizer may be configured to resolve underlying intent as a function of signal, state and context to identify best possible response though the mindmap. Industry specific ontology may be realized through the mindmap, that may act as a reasoning platform, wherein the connections constantly evolve with every signal. Since the response is a function, a rationale for taking decisions can be expressed through an explainer component. With enriched context, cognizer can predict the next possible intent and proactively incite an action from the subject in focus through an inciter component.

In one or more components, the cognitive engine of the cognitive platform, which may reside between Edge computing devices and the Data platforms may comprise plurality of components. The plurality of components may comprise one or more micro services such as, but not limited to cognizer, inceptor, inciter, resolver and/or fetcher. The plurality of components may also comprise a document data store, referred as central intelligence store and a graph database, referred as knowledge graph. The plurality of components further comprises an agent manager. All these components are enabled to execute plurality of instructions through one or more processors associated with the cognitive platform, which are explained in subsequent paragraphs.

In one or more embodiments, the cognize master (also referred as 'cognizer') may be an abstract and generic service that is configured to serve as a single point of contact to build intelligence from and optionally respond to any signals initiated directly by at least one entity. The signals that are initiated directly by the one or more entities may be termed as external signals, also referred as external digital events. The cognizer may be configured to receive the external digital events and respond to at least one of the one or more entities. Here, the at least one of the one or more entities to which the cognizer is configured to respond may be the one entity from which the external digital events are originated or any other entity, which is further identified by determining intent of the external digital events based on machine learning models though interaction with other components of the cognitive engine. The cognitive engine may be configured to resolve underlying intent of the external digital events and determine response. Based on the response, the cognizer may be configured to augment the state information and the context information with added insights for the corresponding entity.

In an example embodiment, an employee in an organization may be asking questions through a chatbot in a natural language.

```
{
    "MasterEntity": {
        "EntityType": "Employee",
        "EntityId": "XYZ"},
    "signalType": "TextQuery",
    "signal": {
        "userQuery": "What are the data science skills in demand? " }
}
```

Also, a web activity of the user may be captured though the congnizer.

```
{
    "MasterEntity": {
        "EntityType": "Customer",
        "EntityId": "Microsoft"},
```

-continued

```
    "signalType": "WebActivity",
    "signal": {
        "TopicOfInterest": ['Cloud Security', 'Big Data']}
    }
```

In the above example, the cognizer may be configured to obtain the external digital event which a web activity of a user/employee in an organization wherein user may be searching for terms like Cloud Security and Big data through a browser or any other application at the device associated with user, capable of connecting to internet over a computer network. The cognizer is configured to accomplish abstraction by identifying one or more objects (information) of the entity such as master entity object and signal object. The signal object may be extracted from payload of the received signal (external digital event).

In one or more embodiments, the central intelligence store is configured to support both the cognizer and the inceptor. The central intelligence store may be a document data store configured to persist intelligence about the entities as context and state that can be applied across different scenarios. Below is an example of a context information and a state information that is built around an Employee. The attributes in the context information may be built through active user interaction i.e. through a cognizer

```
{
    "MasterEntity": {
        "EntityType": "Employee",
        "EntityId": "XYZ"
    },
    "Context": {
        "SkillsInFocus": ['Python', Tensorflow'],
        "EngagementScore":25,
        "Aspirations": ['RoleChange'],
        "Accounts": ['Microsoft', 'Aetna']
        "LoctionInFocus":['Seattle','SFO']
    }
    "MotiveLog":"SkillsOnDemand", "FindLearningPaths",
    "Signals":['Xxxxcdcdcddcc', 'Yxxxcdcdcddcc','Zxxxcdcdcddcc',]
}
```

The state information may be built around an employee through one or more learning agents managed by an agent manager. The example of state of an employee is as below:

```
{
    "MasterEntity": {
        "EntityType": "Employee",
        "EntityId": "XYZ"
    },
    "State": {
        "Team": ['1232', '121211', '453432'],
        "Unit":'DNACTO',
        "Manager":'ABC'
        "Performance": 'Good'
    }
}
```

In one or more embodiments, the inceptor may be configured to execute a micro service to perceive any indirect signal (also referred as 'internal digital events'). For example, the signal detected by the inceptor may be:

```
{
    "MasterEntity": {
        "EntityType": "Employee",
        "EntityId": "XYZ"},
    "signalType": "FrequentUnplannedLeaves",
    "signal": {
        "Occurrences": "5"
    }
}
```

In one or more embodiments, the resolver may be leveraged by the cognizer and the inceptor. The resolver may be configured to determine the intent/motive behind the signal or the digital event based on the context information and the state information capture around the entity to identify the appropriate action and target entity that is best suited for the generated signal or digital events. Based on the indirect signal or the internal digital events detected by the inciter, the resolver may be configured to receive the internal digital events from the inceptor along with the context information and state information of the employee. Further, the resolver may be configured to receive the context information and state information from the central intelligence store for the entity associated with the internal digital events, wherein entity in the present example is an employee. The resolver, based on the signal received from the inceptor and the context information and the state information obtained from the central intelligence store, the resolver may determine the intent/motive behind the indirect signal as 'FindingOpenPositions', considering the employee's aspiration and may identify the target entity to be the manager of the employee. Based on the determined intent and the target entity, the resolver may be configured to send one or more instructions to fetcher component.

In one or more embodiment, the fetcher component may be configured to execute a micro service that is designed and configured to dynamically convert the combination of, but not limited to, the motive behind the indirect signal, the context information and the state information into a data fetch query to be executed on the mindmap or an external database. A query template for each type of signal may be stored central intelligence store. A query template may be received from the central intelligence store based on signal type, context information and state information and the fields in the query template may be populated with context information and state information to generate an executable data fetch query. The fetcher component may execute the data fetch query to receive the response from the database as below:

```
{
    "MasterEntity": {
        "EntityType": "Employee",
        "EntityId": "ABC"},
    "SignalType": "FrequentUnplannedLeaves"
    "Motive": "FindOpenPositions",
    "Results": [
        {"Location": "SFO",
         "Start Date": "01-Jan-2021",
         "Role": "Tech lead"
        },
        {"Location": "Seattle",
         "Start Date": "01-Jan-2021",
         "Role": "Tech lead"
        } ]
}
```

In one or more embodiments, the inciter component may be configured to receive response from the fetcher and convert the response into a human readable text that can be sent to a computing device associated with the entity over a computer network, which in the present example is a manager and incite an action. Optionally, the response obtained from the fetcher may be used as an insight and may be associated with the context information stored in the central intelligence store and relationship data stored in the form of graph in the mindmap. This information may further be used in subsequent digital events, either direct or indirect to provide response to the entity accordingly. In the present example, as the intent behind the signal is determined to be 'FindOpenPositions' and the result set contains two options, the text rendered to the device associated with the manager would be, for example, 'Would you like to consider the 2 opening positions in US for XYZ'. As illustrated, the cognitive platform is capable of finding an indirect signal or indirect digital event which is an inactivity of an aspiring employee wherein his/her manager is approached based on the generated signal, context information and state information of any employee.

In one or more embodiments, the cognitive platform may also comprise an explainer module, which may be configured to render rationale behind the incitation through a visual representation on a display unit. The context information, the state information and the signal that contributed to the incitation may be visually represented.

In an example embodiment, the cognitive platform may be configured to derive insights and orchestrate data automatically by receiving both direct signal and indirect signal in an integrated manner. In a real world scenario, consider a wardrobe creator (stylist) and a customer are connected to a cognitive platform in a fashion domain, but not be limited one stylist or one customer as the cognitive platform is configured to cater requests and responses of multiple source entities and multiple target entities. As a prerequisite (can also be part of registration of customer and stylist registering themselves on an e-commerce site), the cognitive platform may store mindmap of customer, style and wardrobe preference of the customer. Central intelligence store may be configured to persist (store) state information of the stylist and the customer. The stylist and the customer may be connected to e-commerce website through their personal computing device, either through a browser or an app installed on the personal computing device or any other mode of communication that connects to the e-commerce platform and in turn to the cognitive platform. As the cognitive platform is configured to access signals or the activity of the entities across platforms, the activities of the customer, be it on the e-commerce site or the app may be monitored by the cognitive platform. The customer may have provided access to the image gallery or the virtual wardrobe to the cognitive platform through the app installed on the personal computing device. As mentioned above, the data is not kept idle and is set in motion by the cognitive platform. Inceptor may be configured to detect a new persona template for the stylist. The inceptor may also be configured to detect new style that can be part of customer's wardrobe. As described in earlier paragraphs the inceptor may be configured to receive indirect signal and here the indirect signal is the analysis made based on customer's gallery and virtual wardrobe and then initiating the interaction with the target entities and inciting them to act upon. As a next step, the cognitive platform may be configured to send persona template to the stylist through the inciter. Also, the cognitive platform may be configured to send the new styles to customer's wardrobe through the inciter. It is to be noted that the inciter may be configured to send persona template to the stylist and new styles to customer's wardrobe by composing the data package as disclosed in earlier paragraphs of the present disclosure. After receiving the persona template from the inciter, the stylist may perform modifications to the persona template, for example, adding new styles, removing styles, customizing the styles and add it to the customer's list. There could be many customers connected to cognitive platform. The stylist may prepare unique persona to each customer available under stylist's list. The cognizer may be configured to receive signal from the stylist and may transform the persona to unique proposal for each customer based on the context information and state information of each customer. The context information for each customer in central intelligence store may be updated based on the proposals prepared for each customer. The cognizer may now send the exclusive proposals, by composing data package, possibly along with a deep link (in the form of a URL) to point to the proposed action intended to each customer through the inciter. The customer may be notified at the personal computing device, though a notification or a message. The customer, using the personal computing device may review the exclusive proposal and may accept the proposal which causes the signals to be communicated to the cognitive platform. The cognitive platform, through cognizer may be configured to receive signals comprising the accepted proposal of wardrobe from the customer and the cognizer may convert the proposal into a purchasing order. Now, the context information and the state information stored in the central intelligence store may be updated with new context information and state information based on the communication received from the customer i.e. the accepted proposal and the purchasing order details.

It is to be noted from the above example that the data stored in the cognitive platform is made to act on the entities, pushing them to take action by sending them the data or information what they need or interested in. M:N exclusivity is achieved through the cognitive platform wherein many to many interaction is achieved between multiple entities. The communication between the entities and the cognitive platform is non-linear. The cognitive platform initiates the conversation with customized communication.

FIG. 6A-6M are series of diagrams illustrating the evolution of mindmap and the interaction of various components of cognitive data platform, according to one or more embodiments. The mindmap may be configured to store industry specific ontologies such as, but not limited to Retail, Finance, Insurance etc, in the form of graphs that act as reasoning platform for the cognitive computing engine and the FIG. 6A-6M illustrates how the mindmap evolves during the execution of functions at various components of the cognitive data platform through one or more learning agents managed by an agent manager 220.

In one or more embodiments, FIG. 6A-6M illustrates architecture wherein cognizer 210, inceptor 212, and inciter 218 interact with long term memory (graph) 602, learning agents 604 and short term memory (context) 606 based on the digital signals received/detected by the signal detectors 608 which may be in communication with cognizer 210 and inceptor 212. The signal detectors 608 may be configured to detect both indirect digital signals (internal digital events) and direct digital signals (external digital events), and communicate the signal information to various components of the cognitive computing engine 206 discussed in various embodiments of the present disclosure.

In one or more embodiments, the long term memory (602) may be a component which forms mindmap and may be configured to store state information of one or more entities and industry specific ontologies that acts as reasoning platform for cognitive computing engine 206. Whenever a signal is received and processed by the cognitive engine 206, insights and state information may be accessed from the central intelligence store 224 for both source entities from where the signal originates and target entities to which the response to be communicated. One or more nodes in the mindmap may represent one or more entities and/or aspects associated with the one or more entities. As illustrated in FIG. 6A-6M, the exemplary nodes may be, customer represented as 'S', educator/stylist represented as 'E', style which may be an aspect associated with any of the one or more entities represented as 'S' and location of the one or more entities represented as One or more edges in the mindmap may represent actions or relationship between one or more nodes in the mindmap. A sample mindmap is described in FIG. 7 in subsequent paragraphs. The learning agents 604 may comprise one or more Machine Learning (ML) components configured to add/remove nodes and edges to the graph and cause mindmap to evolve which further causes cognitive platform to learn and create improvised insights on every signal processed. The short term memory (context) 606 may be configured to store context information of both source entities and target entities, which is used to process received signals and to compose response for the target entities. The short term memory 606 may be associated with and stored as part of central intelligence store 224.

Figure 6A:
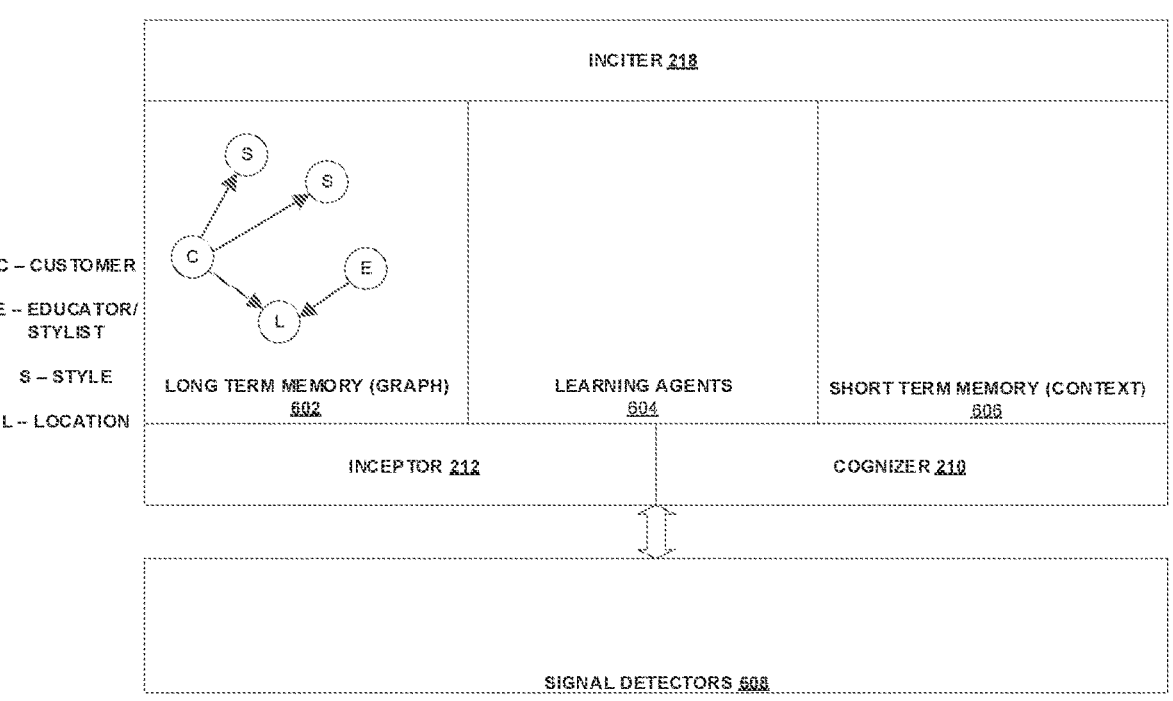
FIG. 6A-6M are series of diagrams illustrating the evolution of mindmap and the interaction of components of cognitive data platform, according to one or more embodiments
Figure 6B:
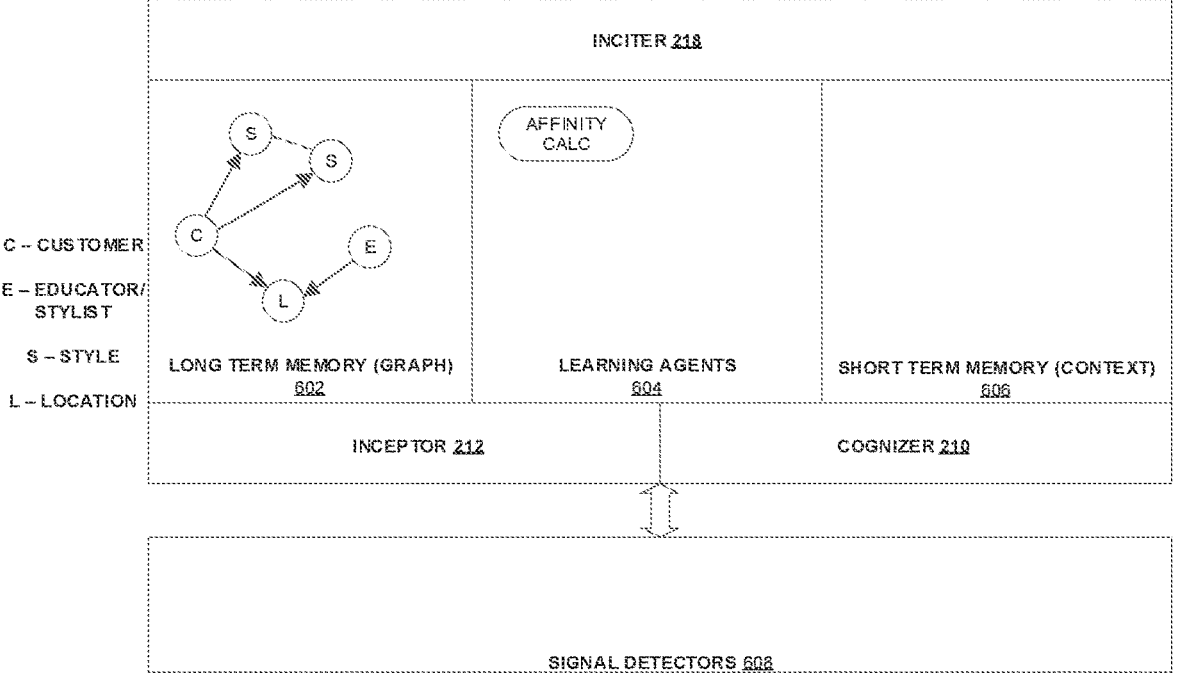

In one or more embodiments, FIG. 6A illustrates that long term memory 602 may comprise knowledge graph (mindmap) with set of nodes connected with edges (foundation graph) representing entities end relation between entities. FIG. 6B illustrates a scenario of wherein the stored data which is idle is set to motion wherein the possible relation with stored data may be identified. One of the learning agents 604—'affinity cal', an ML component which may be invoked, which may calculate affinity between various data points or styles based on customer activity, state information, context information of the customer. As illustrated in FIG. 6B, the affinity between two style may be identified which cause the graph to be updated by connecting two style nodes with an edge (indicated with dotted line to differentiate for reference purpose). The updated graph may be persisted in the mindmap 222.

Figure 6C:
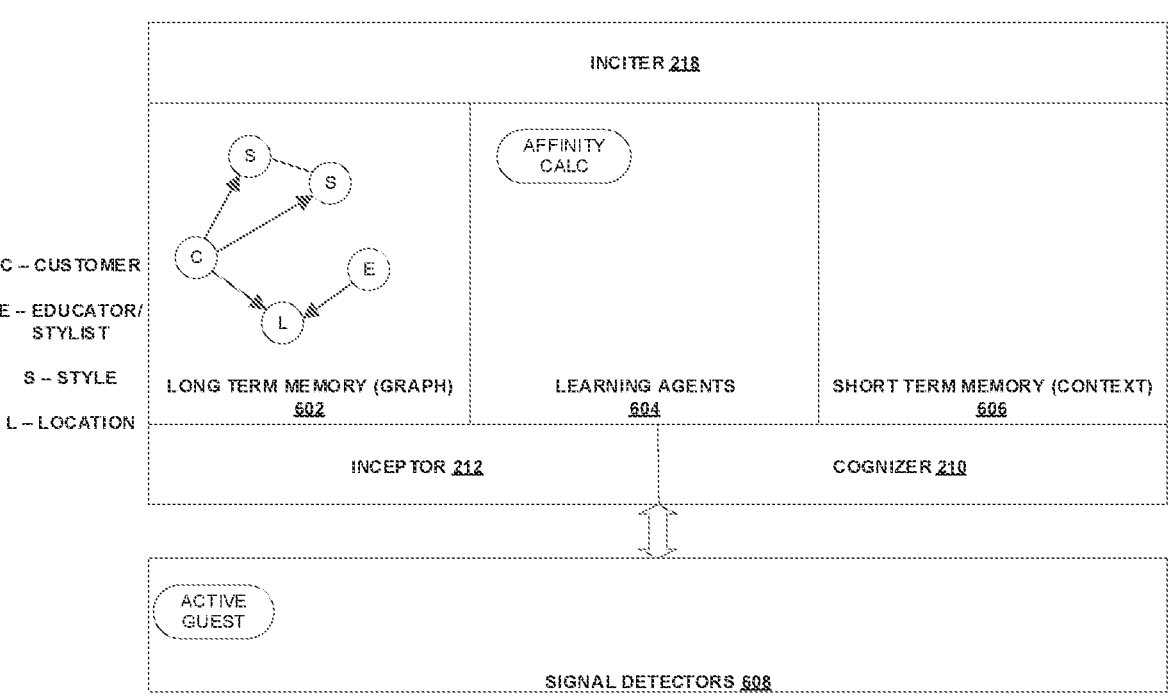
Figure 6D:
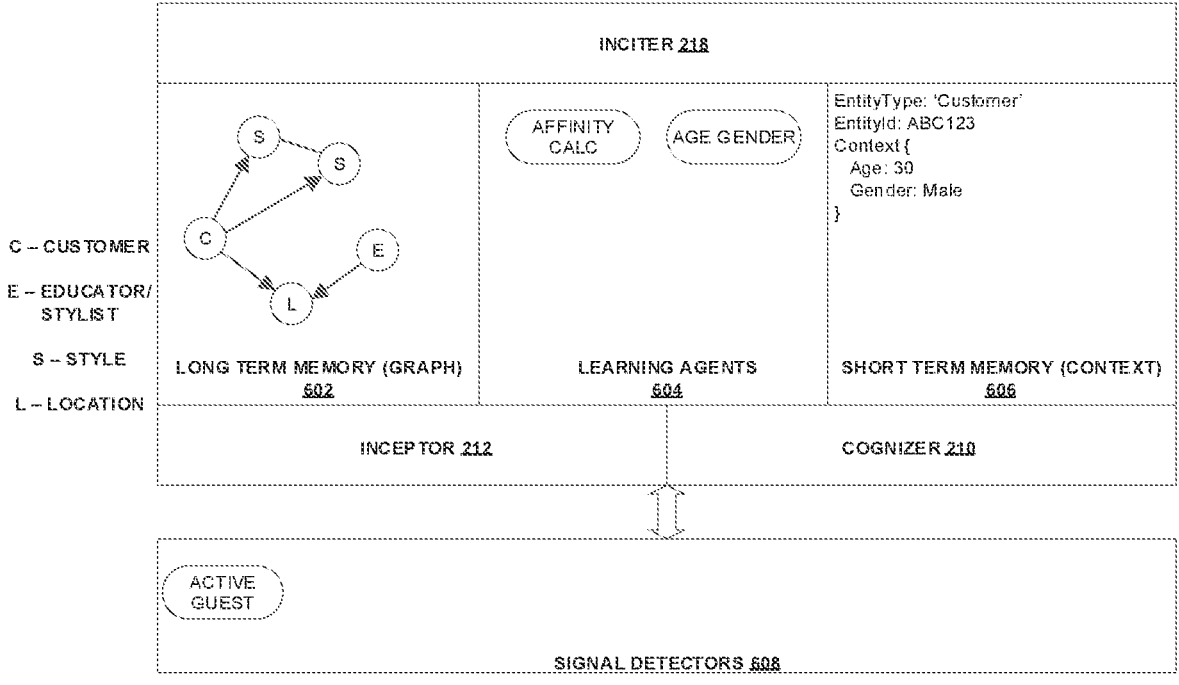

FIG. 6C illustrates a scenario wherein a guest (customer) may have accessed the system through a personal computing device. The customer may sign in and explore styles, wherein such digital event may be received by signal detectors as 'active guest'. The context information of the customer is fetched from the central intelligence store 224 wherein the entity Type, entity ID and context information such as age and gender may be extracted from the central intelligence store 224 based on the payload data accessed from the received signal as illustrated in FIG. 6D. In other way, the entity Type and entity ID maybe extracted from the payload present in the received signal further which the context information of the customer with the entity ID may be obtained from the central intelligence store 224. The inceptor 212 may be configured to invoke ML component 'age gender' of the learning agents 604 and build context for the active customer.

Figure 6E:
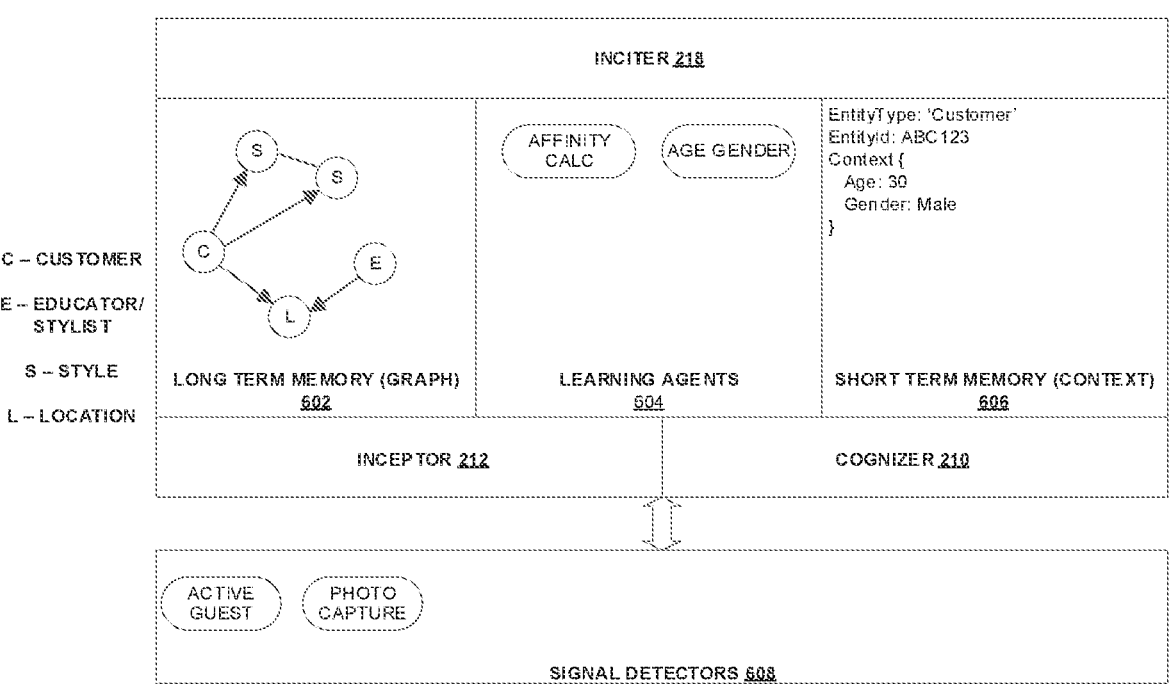
Figure 6F:
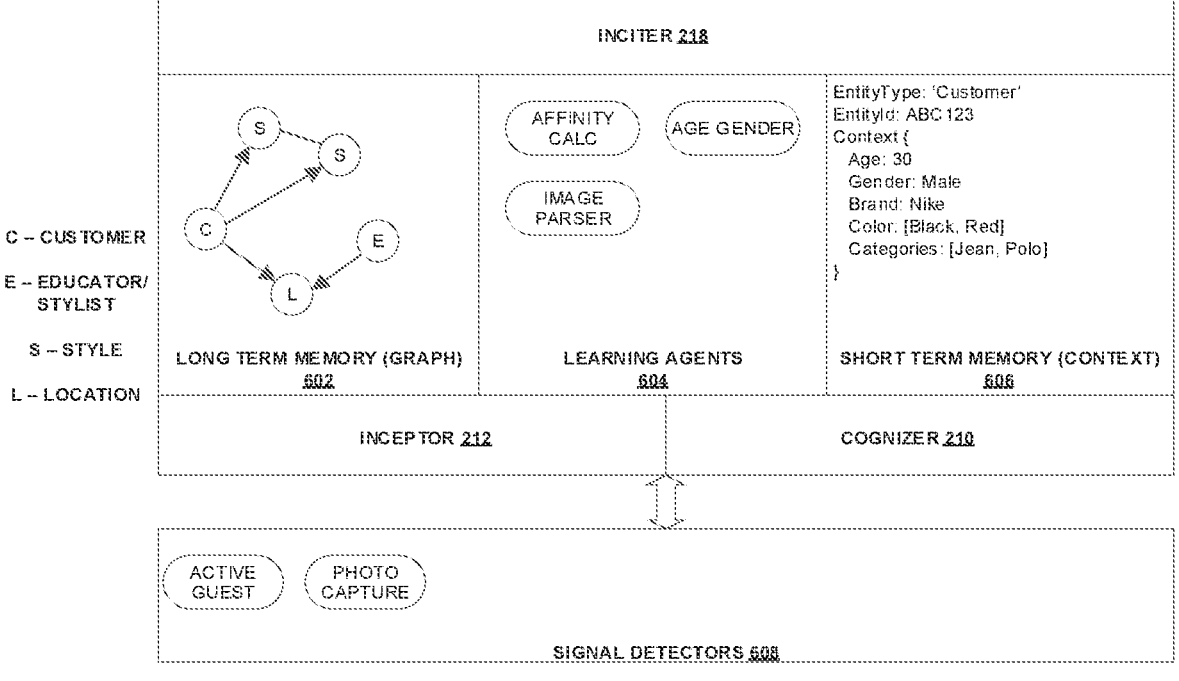
Figure 6G:
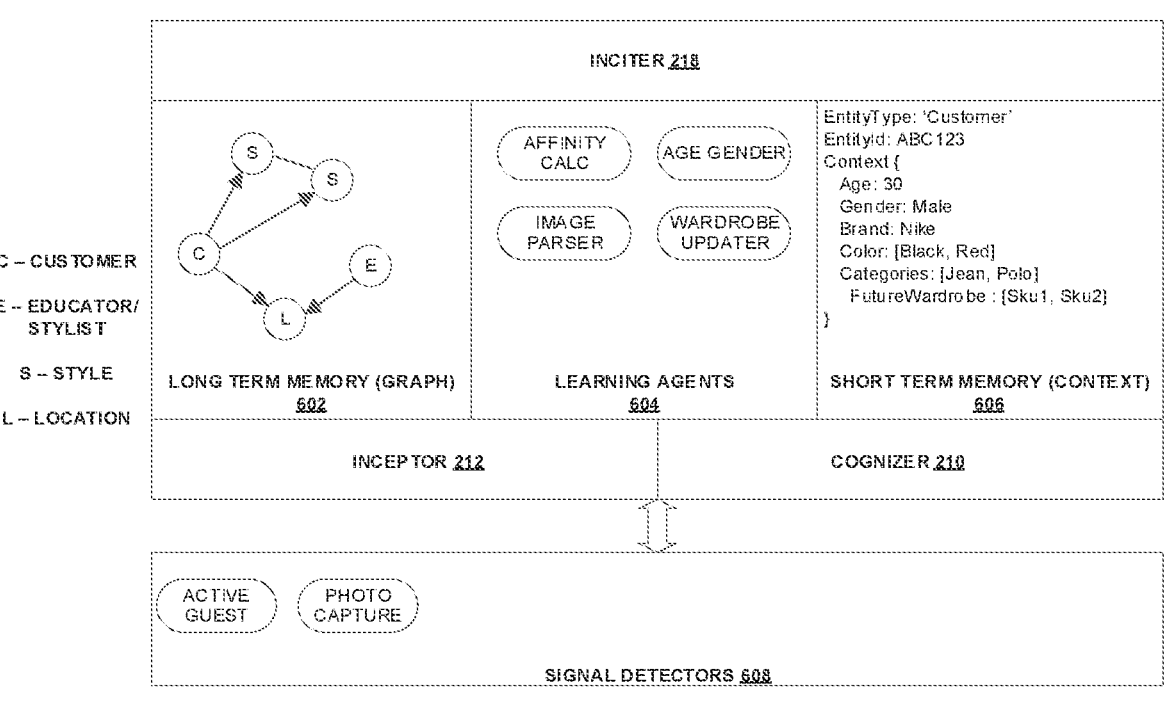
Figure 6H:
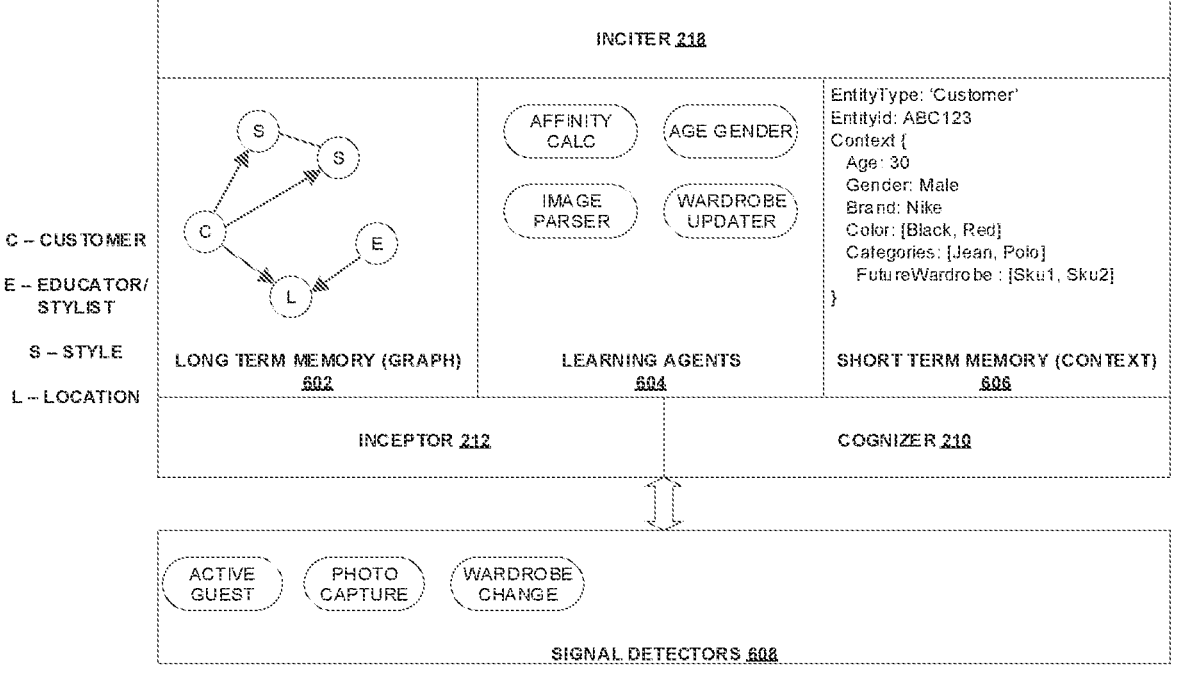

When the customer uploads a photo (digital image) of the product that customer may be interested in either by capturing a photo of a product with the personal computing device or by browsing the product image either on web browser or storage of the personal computing device or any other way which causes image to be uploaded to the cognitive computing platform. The signal detectors 608 may be configured to detect 'photo capture' signal and forward the received signal to the cognizer 210 as illustrated in FIG. 6E. The cognitive computing engine 206 may invoke 'image parser' ML component, through the agent manager 220 to parse the digital image to extract the features based on the stored context information and state information of the customer. The feature may be extracted from the digital image based on image extraction technologies such as, but not limited to Tensorflow, Pytorch, Keras, and/or Theano. Based on the stored context information and state information of the customer, the one or more features such as, but not limited to brand of the product, colour of the product and category of the product may be extracted from the image and further be stored as context information in the central intelligence store 224 as illustrated in FIG. 6F. As there is an updated context information in the central intelligence store 224, the cognitive computing engine 206 may invoke an ML component 'wardrobe updater' of the learning agents 604 through the agent manager 220, which may be configured to add those products to the virtual wardrobe of the customer which match the context information of the customer. Also, the context information i.e. short term memory 606 may be updated with information about the wardrobe update as illustrated in FIG. 6G. As a part of adding product to the customer's virtual wardrobe, an indirect signal 'wardrobe change' may be received by the signal detectors 608 which may send notification to the customer with a data package, inciting the customer to act on the notification.

Figure 6I:
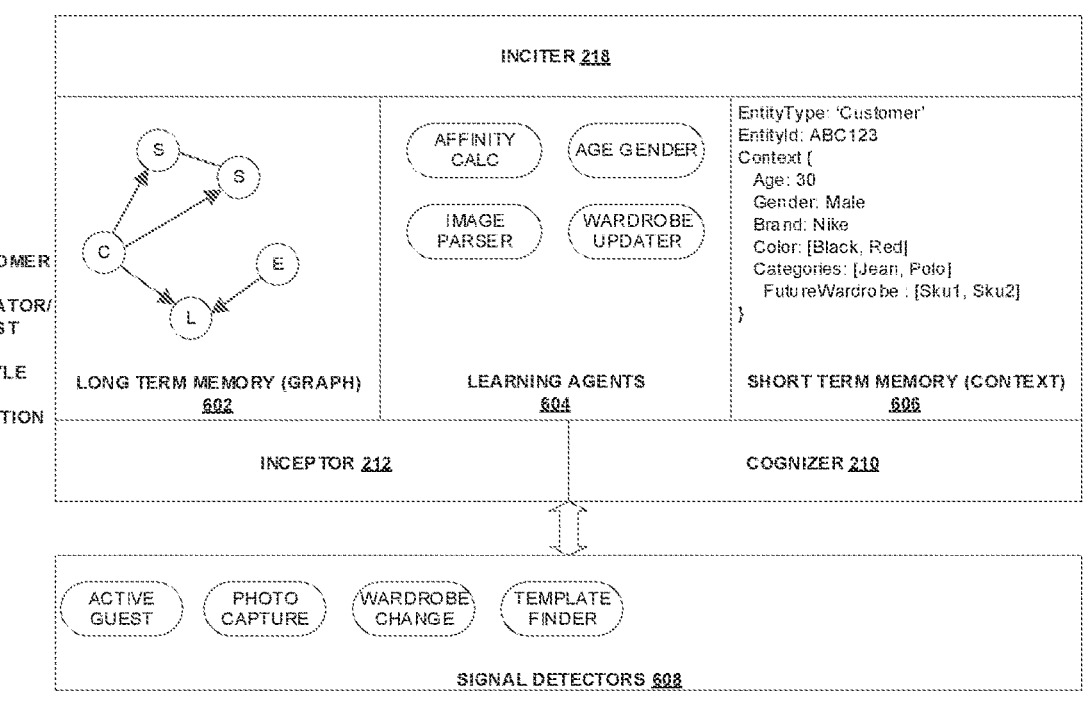

For example, consider that new styles of products have been launched and added as on e-commerce platform. This may trigger an indirect signal 'template finder', which may identify a new persona template on the recently launched new styles of products further causing the inciter 218 to send a composed data package to a personal computing device associated with a stylist, as illustrated in FIG. 6I.

Figure 6J:
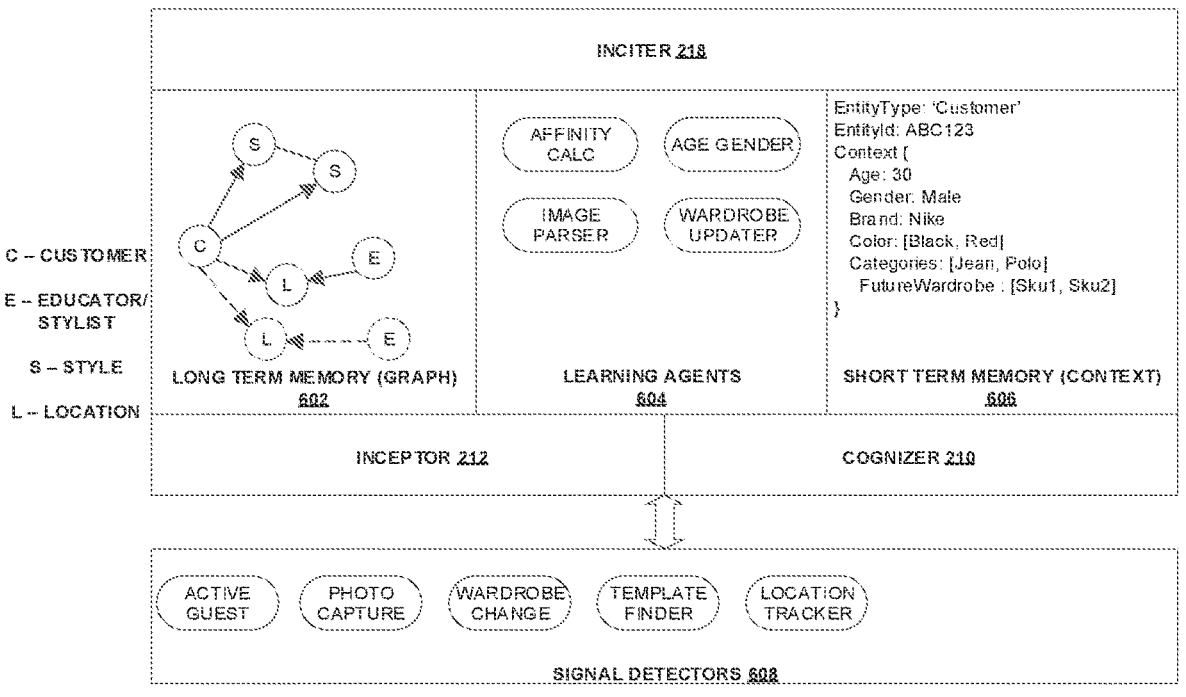

Consider a case wherein the customer moves to a new location. A new signal 'location tracker' may be detected by the signal detectors 606 which is received by the cognizer 210. The new location information may be extracted from the payload of the signal received and may add the location information as a new node to the graph present in the mindmap 222 (long term memory (602)), connecting the customer node with an edge. Further the inciter 218 may send a data package to a stylist present near the new location of the customer and also may send a data package to the customer, informing about a stylist available near the new location of the customer. This may cause the graph in the mindmap 222 (long term memory (602)) wherein new node for stylist is created and linked to the new location node of the customer which is connected to the customer node (represented in dotted lines), as illustrated in FIG. 6J. Based on the data package delivered to the customer, the customer may choose to contact the stylist nearby, hence inciting the user to act.

Figure 6K:
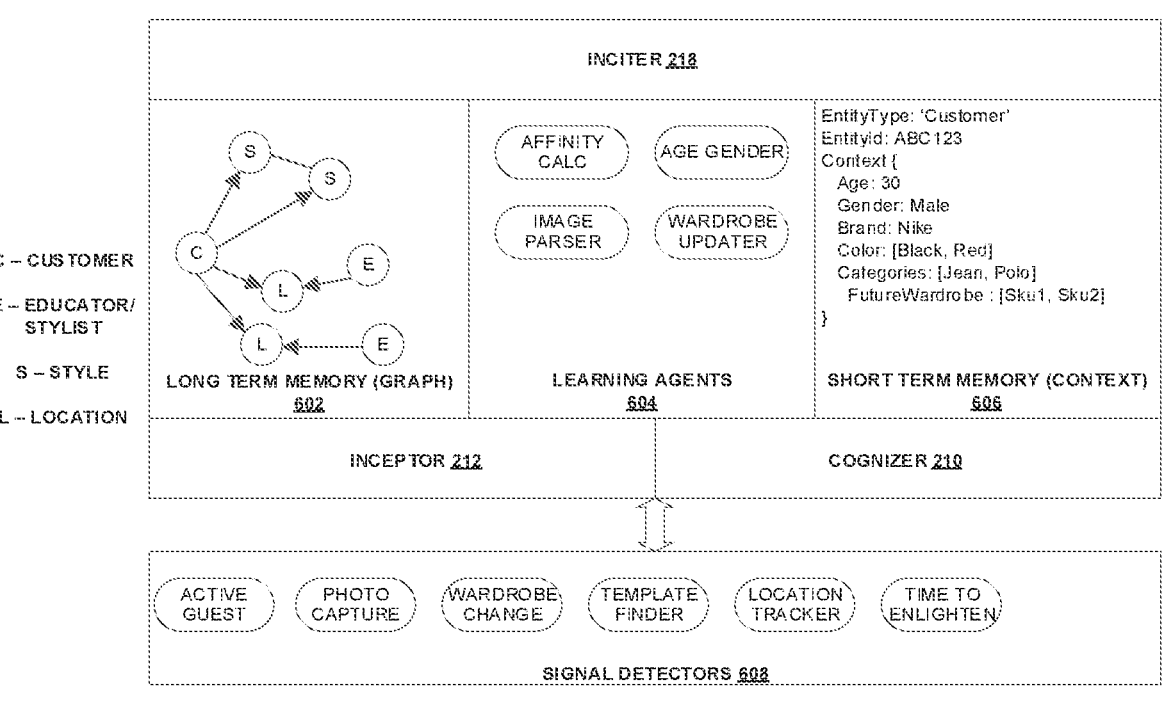

Consider that the customer fixed an appointment with the stylist that is recommended by the cognitive platform 200. On the day of appointment, the inceptor may detect indirect signal 'Time to enlighten' about the appointment timings as detected by the signal detector 608. The inciter may compose a data package based on context and state information of the user and send it to the stylist, which may help the stylist to learn about the customer before an appointment, as illustrated in FIG. 6K. Based on the data package delivered to the stylist, the stylist may experiment with the idea templates though an ML component of the learning agent 604—'best bets' and with the functionalities of the cognizer

Figure 6L:
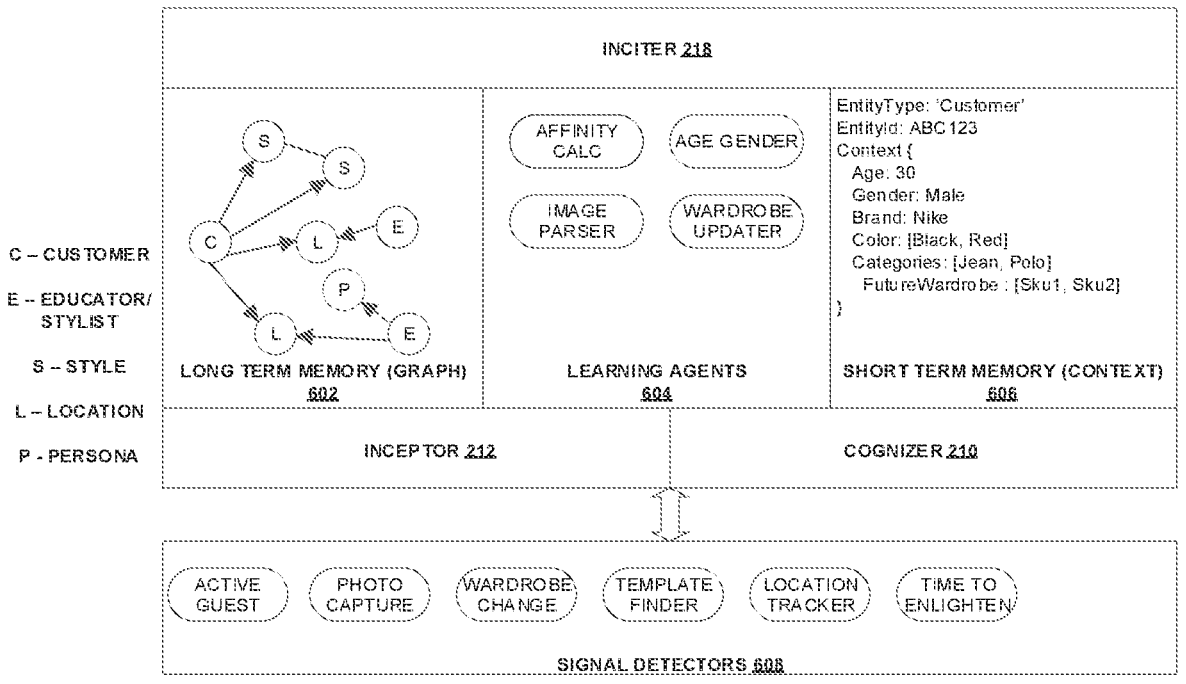
Figure 6M:
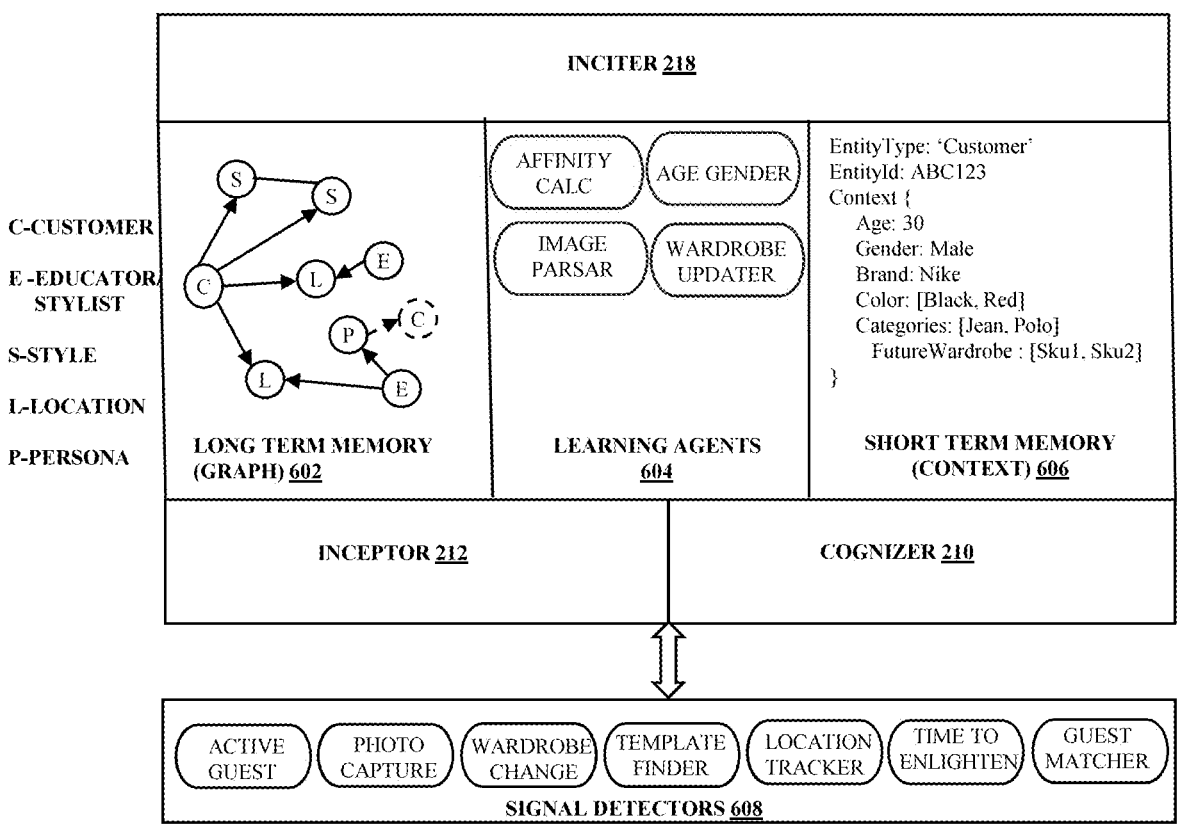

210, the stylist may create a unique persona to the customer. Based on the created persona, the mindmap 222 (long term memory (602)) may be updated with new node 'P' and liked to the stylist node as illustrated in FIG. 6L. Further the cognitive computing engine 206 may be configured to determine whether the unique persona created for the customer by the stylist may match context information and state information of any other customer. A new signal 'guest matcher' may be perceived/received at the signal detectors 608 which further causes the inciter to compose a data package based on the context information and state information of the other customer and send the data package to the personal computing device of the other customer. A new node (illustrated in dotted lines) for the other customer may be added in the graph associated with the mindmap 222 (long term memory (602)) as illustrated in FIG. 6M.

Figure 7:
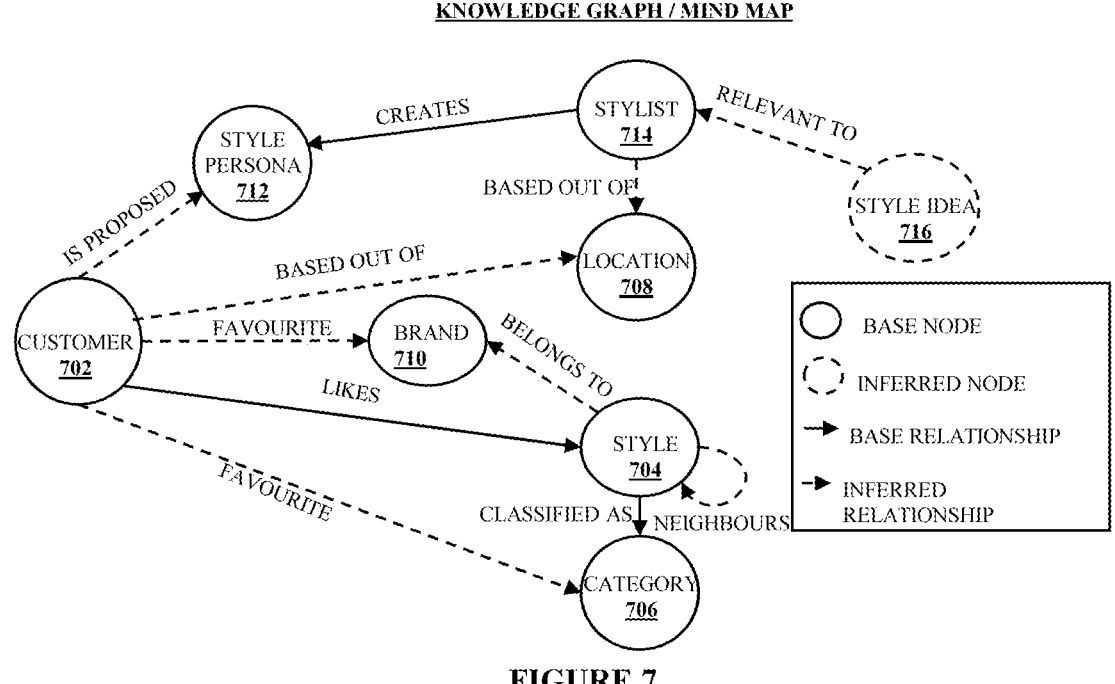
FIG. 7 is a graph diagram illustrating a knowledge graph/mindmap developed by the cognitive platform for a domain, according to one or more embodiments.

FIG. 7 illustrates a knowledge graph/mindmap developed by the cognitive platform for a domain, according to one or more embodiments. The graph which forms the mindmap may comprise many nodes and edges, wherein the nodes representing one or more entities or the aspects associated with the entities and the edges representing relationship between the nodes. In an exemplary embodiment, the nodes such as customer 702, style 704, category 706, location 708, brand 710, style persona 712 and stylist 714 may be base nodes. The node style idea 716 may be an inferred node (indicated with dotted lines) The edges may represent either base relationship or inferred relationship between one or more nodes. Any key inferences which are not facts may be represented as inferred nodes or inferred relationships. The base nodes and the base relationships may represent that they are facts associated with entities stored as a part of central intelligence store. The inferred nodes and inferred relationships may represent that are generated programmatically through one or more learning agents. One or more learning agents, which are Machine Learning (ML) components may be configured to enrich/evolve the mindmap regularly by adding new nodes and new relationships (represented with dotted lines) to create and infer new entities and also new intents that could be fulfilled for the target entities.

Figure 8:
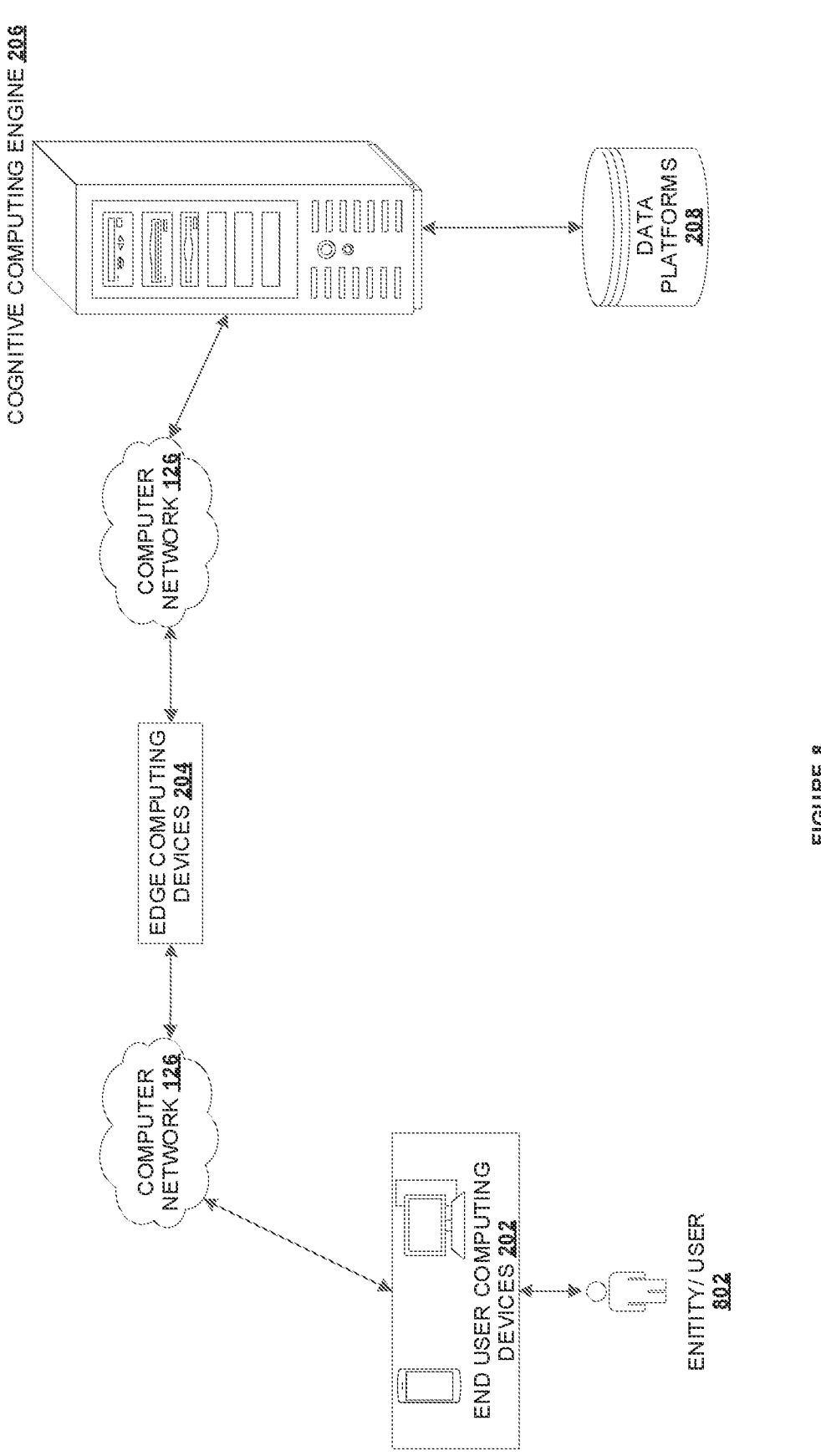
FIG. 8 is an architecture diagram, illustrating cognitive computing environment for autonomous data orchestration, according to one or more embodiments.

FIG. 8 is an architecture diagram, illustrating cognitive computing environment for autonomous data orchestration, according to one or more embodiments. In one or more embodiments, the cognitive computing environment may comprise one or more components (also, as represented in FIG. 2), but not limited to one or more entity/user 802, one or more end user computing devices 202 (also referred client devices 202), edge computing devices 204, cognitive computing engine 206 (also referred as cognitive computing server 206) and/or data platforms 208. The entity/user 802 may be associated with end user computing devices 202. The end user computing devices 202 may be communicatively coupled to edge computing devices 204 though a computer network 126 (also represented in FIG. 1). The edge computing devices 204 may be communicatively coupled to cognitive computing engine 206 through a computer network 126. The cognitive computing engine 206 may be communicatively coupled to data platforms 208.

In one or more embodiments, the end user computing devices 202 may be configured to communicate one or more digital events (digital signals) to cognitive computing engine 206 though edge computing devices 204 based on one or more actions performed by the entity/user 802. Also, the end user computing devices 202 may be configured to communicate one or more signals to the cognitive computing engine 206 without intervention of entity/user 802. For example, when entity/user 802 moves to a new location, the end user computing device 202 may automatically send the new location information of entity/user 202 to the cognitive computing engine 206. The location information may be generated at the end user computing device 202 using capabilities that are pre-configured at the end user computing devices 202 such as, but not limited to GPS, GLONASS and/or NavIC. The edge computing devices 204 may be configured to act as intermediate device between end user computing devices 202 and the cognitive computing engine 206. The edge computing devices 204 are general purpose devices which are able to run full-fledged operating systems. They are connected to the network either directly or through a mediation or an Edge Gateway.

In one or more embodiments, the data platform 208 may comprise one or more data storage platforms as described in various embodiments of the present disclosure. In one or more embodiments, the cognitive computing engine 206 may comprise one or more components such as, but not limited to, a cognizer 210, an inceptor 212, a resolver 214, a fetcher 216, an inciter 218, agent manager 220, a mindmap 222, a central intelligence store 224, an explainer 226 and a context updater 228. The one or more components of the cognitive computing engine 206 may be realized through either or combination of hardware and/or software components configured to execute one or more instruction through one or more processor embedded in the cognitive computing engine 206. Each of the components of the cognitive computing engine 206 may be communicatively coupled to the other components through at least one of, but not limited to application program interfaces (APIs), remote procedure calls (RPCs), sub routines or through dedicated hardware. In one or more embodiments, the cognitive computing engine 206 may be configured to receive one or more direct digital events (signals) from the end user computing devices 202. The cognitive computing engine 206 may also be configured to detect/perceive one or more indirect digital events (signals). The cognitive computing engine 206 may be configured to communicate one or more response to user 802 through the end user computing devices 202. Functions and operations of the cognitive computing engine 206 is described in various embodiments of the present disclosure.

The advantage of the invention described in the present disclosed is that the cognitive platform realizes a continuous learning autonomous system with cognitive capability, which functions intelligently with its subjects by leveraging data and can be fit in to any domain which required autonomous decision making and autonomous data orchestration. A subject can be human, digital systems or a machine. With the disclosed invention, insights from data may never stay idle in dashboards and reports that wait for being utilized by users. The cognitive platform will set the insights in motion and serve as a system of foresight. The cognizer and inceptor may be configured to actively look for insights that can be applied as they respond to various signals. The cognitive platform of the present disclosure which behaves intelligently may create possibility of digitizing user personas i.e. the customer can be served through a salesperson's digital counterpart. Through proactive signals received through inceptor, processed and response delivered through the inciter, with an evolved cognitive computing engine, the cognitive platform will shape the intuition of the decision makers in the enterprise.

The specification and drawings in the present disclosure are to be regarded in an illustrative rather than a restrictive sense.

What is claimed is:

1. A cognitive platform, comprising:
at least one processor;
a cognitive computing engine; and
at least one memory unit operatively coupled to the at least one processor, having instructions stored thereon that, when executed by the at least one processor, cause the at least one processor to:
generate, by the cognitive computing engine, at least one digital event, wherein the at least one digital event is generated based on at least one of previous activity or inactivity of one or more entities communicatively coupled to the cognitive platform;
access, by the cognitive computing engine, data from a central intelligence store based on the generated at least one digital event, wherein the data comprises context information, state information, and a plurality of previous digital events stored in the central intelligence store;
determine, by the cognitive computing engine, an intent of the generated at least one digital event based on the data accessed from the central intelligence store, wherein:
the intent is a function of the context information, the state information, and the plurality of previous digital events, and
the cognitive computing engine is configured to learn from the at least one generated event via one or more machine learning (ML) models configured to automatically update based on the data accessed from the central intelligence store;
identify, by the cognitive computing engine, at least one target entity based on the determined intent;
compose, by the cognitive computing engine, a data package for the identified at least one target entity;
transform, by the cognitive computing engine, the data package to a natural language text, wherein the transformed data package comprises a Uniform Resource Locator (URL) link to point to a proposed action intended for the identified at least one target entity;
communicate, by the cognitive computing engine, the transformed data package to the identified at least one target entity; and
update, by the cognitive computing engine, the central intelligence store with the generated at least one digital event and the determined intent for subsequent digital events.

2. The cognitive platform of claim 1, wherein the at least one target entity is further identified based on the data accessed from the central intelligence store.

3. The cognitive platform of claim 1, wherein the identified at least one target entity is one or more external computing devices communicatively coupled to the cognitive computing engine over a computer network.

4. The cognitive platform of claim 1, wherein the data package is composed based on the determined intent, the data received from the central intelligence store, and relationship data from a mindmap.

5. A computer implemented method for a cognitive platform, comprising:
generating, by a cognitive computing engine, at least one digital event, wherein the at least one digital event is generated based on at least one of previous activity or inactivity of one or more entities communicatively coupled to the cognitive platform;
accessing, by the cognitive computing engine, data from a central intelligence store based on the generated at least one digital event, wherein the data comprises context information, state information, and a plurality of previous digital events stored in the central intelligence store;

determining, by the cognitive computing engine, an intent of the generated at least one digital event based on-the data accessed from the central intelligence store, wherein:

the intent is a function of the context information, the state information, and the plurality of previous digital events, and;

the cognitive computing engine is configured to learn from the generated at least one digital event via one or more machine learning (ML) models configured to automatically update based on the data accessed from the central intelligence store;

identifying, by the cognitive computing engine, at least one target entity based on the determined intent;

composing, by the cognitive computing engine, a data package for the identified at least one target entity;

transforming, by the cognitive computing engine, the data package to a natural language text, wherein the transformed data package comprises a Uniform Resource Locator (URL) link to point to a proposed action intended for the identified at least one target entity;

communicating, by the cognitive computing engine, the transformed data package to the identified at least one target entity; and updating, by the cognitive computing engine, the central intelligence store, with the generated at least one digital event and the determined intent for subsequent digital events.

6. The computer implemented method of claim 5, wherein the at least one target entity is further identified based on the data accessed from the central intelligence store.

7. The computer implemented method of claim 5, wherein the identified at least one target entity is one or more external computing devices communicatively coupled to the cognitive computing engine over a computer network.

8. The computer implemented method of claim 5, wherein the data package is composed based on the determined intent, the data received from the central intelligence store and, relationship data from a mindmap.

9. A non-transitory computer readable medium having stored thereon instructions, comprising machine executable code which when executed by at least one processor, causes the at least one processor to perform steps comprising:

generate at least one digital event, wherein the at least one digital event is generated based on at least one of previous activity or inactivity of one or more entities communicatively coupled to a cognitive platform;

access data from a central intelligence store based on the generated at least one digital event, wherein the data comprises context information, state information, and a plurality of previous digital events stored in the central intelligence store;

determine an intent of the generated at least one digital event via one or more machine learning (ML) models configured to automatically update based on the data accessed from the central intelligence store, wherein the intent is a function of the context information, the state information, and the plurality of previous digital events;

identify at least one target entity based on the determined intent;

compose a data package for the identified at least one target entity;

transform the data package to a natural language text, wherein the transformed data package comprises a Uniform Resource Locator (URL) link to point to a proposed action intended for the identified at least one target entity;

communicate the transformed data package to the identified at least one target entity; and update the central intelligence store with the generated at least one digital event and the determined intent for subsequent digital events.

10. The non-transitory computer readable medium of claim 9, wherein the at least one target entity is further identified based on the data accessed from the central intelligence store.

11. The non-transitory computer readable medium of claim 9, wherein the identified at least one target entity is one or more external computing devices communicatively coupled to a cognitive computing engine over a computer network.

12. The non-transitory computer readable medium of claim 9, wherein the data package is composed based on the determined intent, the data received from the central intelligence store and, relationship data from a mindmap.

13. The cognitive platform of claim 1, wherein the at least one memory unit comprises a mindmap configured to store industry-specific ontologies, wherein the mindmap comprises a plurality of nodes representing the one or more entities and aspects associated with the one or more entities, wherein the mindmap comprises a plurality of edges representing relationship between the plurality of nodes.

14. The cognitive platform of claim 13, wherein the instructions when executed by the at least one processor, further cause the at least one processor to add or remove nodes and edges in the mindmap using one or more machine learning models in response to processing each generated digital event.

* * * * *